(12) United States Patent
Tatemura

(10) Patent No.: US 9,726,797 B2
(45) Date of Patent: Aug. 8, 2017

(54) NEAR-INFRARED CUT FILTER

(71) Applicant: Asahi Glass Company, Limited, Chiyoda-ku (JP)

(72) Inventor: Mitsuyuki Tatemura, Haibara-gun (JP)

(73) Assignee: ASAHI GLASS COMPANY, LIMITED, Chiyoda-ku (JP)

(*) Notice: Subject to any disclaimer, the term of this patent is extended or adjusted under 35 U.S.C. 154(b) by 345 days.

(21) Appl. No.: 14/556,338

(22) Filed: Dec. 1, 2014

(65) Prior Publication Data

US 2015/0085354 A1    Mar. 26, 2015

Related U.S. Application Data

(63) Continuation of application No. PCT/JP2013/065184, filed on May 31, 2013.

(30) Foreign Application Priority Data

Jun. 4, 2012    (JP) ................. 2012-126855

(51) Int. Cl.
*G02B 5/22* (2006.01)
*G02B 5/26* (2006.01)
*G02B 5/28* (2006.01)
*G02B 5/20* (2006.01)

(52) U.S. Cl.
CPC .............. *G02B 5/208* (2013.01); *G02B 5/26* (2013.01); *G02B 5/28* (2013.01); *G02B 5/22* (2013.01)

(58) Field of Classification Search
CPC . G02B 5/208; G02B 5/26; G02B 5/28; G02B 5/22

USPC .................................................. 359/359-361
See application file for complete search history.

(56) References Cited

U.S. PATENT DOCUMENTS

| 3,423,147 | A | * | 1/1969 | Thelen | ................... G02B 5/285 |
| | | | | | 359/359 |
| 2009/0025783 | A1 | | 1/2009 | Wernham et al. | |
| 2014/0139912 | A1 | | 5/2014 | Osawa et al. | |
| 2015/0085354 | A1 | | 3/2015 | Tatemura | |

FOREIGN PATENT DOCUMENTS

| DE | 603 12 557 T2 | 12/2007 |
| EP | 1 573 371 B1 | 9/2005 |
| ES | 2 283 875 | 11/2007 |

(Continued)

OTHER PUBLICATIONS

International Preliminary Report on Patentability and Written Opinion issued Dec. 18, 2014 in PCT/JP2013/065184 (submitting English translation only).
U.S. Appl. No. 14/728,115, filed Jun. 2, 2015, Tatemura.

*Primary Examiner* — Thomas K Pham
*Assistant Examiner* — Mitchell Oestreich
(74) *Attorney, Agent, or Firm* — Oblon, McClelland, Maier & Neustadt, L.L.P.

(57) ABSTRACT

A near-infrared cut filter according to the present invention includes a repeated layered structure of a high-refractive index layer, a middle-refractive index layer, and a low-refractive index layer, and includes a transmission band where a mean transmittance is 85% or higher in a wavelength range of 400 nm to 700 nm, and a stopband having a width of 100 nm to 280 nm where a mean transmittance is 10% or lower in a wavelength range of 750 nm to 1100 nm.

21 Claims, 14 Drawing Sheets

(56) References Cited

FOREIGN PATENT DOCUMENTS

| | | |
|---|---|---|
| GB | 2 396 436 | 6/2004 |
| JP | 8-5833 | 1/1996 |
| JP | 11-202127 | 7/1999 |
| JP | 2000-100391 | 4/2000 |
| JP | 2000-147248 | 5/2000 |
| JP | 2006-511838 | 4/2006 |
| JP | 2008-139693 | 6/2008 |
| JP | 4672101 | 1/2011 |
| WO | WO 2004/061490 A1 | 7/2004 |
| WO | WO 2013/042738 A1 | 3/2013 |

* cited by examiner

NEAR-INFRARED CUT FILTER

CROSS-REFERENCE TO RELATED APPLICATIONS

This application is a continuation of prior International Application No. PCT/JP2013/065184, filed on May 31, 2013 which is based upon and claims the benefit of priority from Japanese Patent Application No. 2012-126855 filed on Jun. 4, 2012; the entire contents of all of which are incorporated herein by reference.

FIELD

An embodiment of the present invention relates to a near-infrared cut filter and, in particular, to a near-infrared cut filter having an optical multilayer formed on a transparent substrate.

BACKGROUND

For a digital camera, a digital video and the like, a Charge Coupled Device (CCD) image sensor, a Complementary Metal Oxide Semiconductor (CMOS) image sensor and the like (hereinafter, referred to as solid-state imaging devices) are used. However, spectral characteristics of the solid-state imaging devices have high sensitivities with respect to infrared light as compared to human visibility characteristics. Hence, spectral correction by a near-infrared cut filter is performed in the digital camera, the digital video and the like.

As the near-infrared cut filter, for example, a near-infrared absorption type color glass filter such as fluorophosphate-based glass containing $Cu^{2+}$ ions as a coloring component has been used. However, since the light in a near-infrared region and an ultraviolet region cannot be sufficiently cut only by the color glass filter, an optical multilayer having characteristics capable of cutting near-infrared light is used in combination at present.

The optical multilayer is required to cause no phenomenon of decreasing in transmittance (ripple) in a transmission band from 400 to 700 nm that the solid-state imaging devices requires. In the optical multilayer, a technique of suppressing the ripple has been proposed (Japanese Patent No. 4672101 and Japanese Patent Application Laid-open No. 2008-139693).

SUMMARY

However, even if the optical multilayer can suppress the ripple for light incident thereon at a specific angle, a ripple may occur when the incident angle of light is changed. The techniques described in Japanese Patent No. 4672101 and Japanese Patent Application Laid-open No. 2008-139693 can cope with the suppression of the ripple for light incident at a specific angle, but are not considered the ripple caused by the change in the incident angle of light at all.

In such circumstances, the digital camera, the digital video and the like are further reduced in size and thickness in recent years, and the lens of the digital camera, the digital video and the like is increasingly made to have a wider angle. Therefore, light in a state of further tilted is made incident on the solid-state imaging device. For example, the incident angle of light on the solid-state imaging device has conventionally been 30° or less, but it is strongly required to cope with the incident angle exceeding 30° in recent years.

The above-described ripple further increases in amount of decrease in transmittance as the incident angle of light further tilts. The suppression of the ripple with the change in the incident angle is not taken into consideration in the proposals disclosed in Japanese Patent No. 4672101 and Japanese Patent Application Laid-open No. 2008-139693, so that the ripple does not extremely increase if the incident angle of light on the solid-state imaging device is 30° or less, but a negligible large ripple may occur at an incident angle exceeding 30°. The present invention has been made in consideration of the above problems and its object is to provide a near-infrared cut filter in which a ripple is suppressed.

A near-infrared cut filter according to the embodiment is a near-infrared cut filter including a transparent substrate and an optical multilayer provided on at least one of principal surfaces of the transparent substrate, in which the optical multilayer includes: a high-refractive index layer having a refractive index at a wavelength of 500 nm of 2.0 or higher; a middle-refractive index layer having a refractive index at the wavelength of 500 nm of 1.6 or higher and lower than the refractive index of the high-refractive index layer; and a low-refractive index layer having a refractive index at the wavelength of 500 nm of lower than 1.6, the optical multilayer includes a repeated layered structure expressed by a repeat of (LMHML)^n (n is a natural number of 1 or more) where the high-refractive index layer is H, the middle-refractive index layer is M, and the low-refractive index layer is L, the optical multilayer includes a transmission band where a mean transmittance is 85% or higher in a wavelength range of 400 nm to 700 nm and a stopband having a width of 100 nm to 280 nm where a mean transmittance is 10% or lower in a wavelength range of 750 nm to 1100 nm, and the high-refractive index layer, the middle-refractive index layer, and the low-refractive index layer are stacked so that, where a QWOT (Quarter-wave Optical Thickness) of the high-refractive index layer of the optical multilayer is $T_H$, a QWOT of the middle-refractive index layer is $T_M$, and a QWOT of the low-refractive index layer is $T_L$, in a case where the refractive index of the middle-refractive index layer is equal to or higher than an intermediate value between the refractive index of the high-refractive index layer and the refractive index of the low-refractive index layer, when a maximum value of $2T_L/(T_H+2T_M)$ in which there is no part where a transmittance locally decreases by 5% or more in the wavelength range of 400 nm to 700 nm in spectral characteristics under a vertical incident condition is set to 100% and a minimum value thereof is set to 0%, $2T_L/(T_H+2T_M)$ falls within a range of 100% to 70%, and in a case where the refractive index of the middle-refractive index layer is lower than the intermediate value between the refractive index of the high-refractive index layer and the refractive index of the low-refractive index layer, when a maximum value of $(2T_L+2T_M)/T_H$ in which there is no part where the transmittance locally decreases by 5% or more in the wavelength range of 400 nm to 700 nm in the spectral characteristics under the vertical incident condition is set to 100% and a minimum value thereof is set to 0%, $(2T_L+2T_M)/T_H$ falls within a range of 100% to 70%.

Effect of the Invention

According to the embodiment, the near-infrared cut filter includes the optical multilayer provided on at least one of the principal surfaces of the transparent substrate, in which the optical multilayer includes: the high-refractive index layer having the refractive index at the wavelength of 500 nm of 2.0 or higher; the middle-refractive index layer having the refractive index at the wavelength of 500 nm of 1.6 or higher and lower than the refractive index of the high-refractive index layer; and the low-refractive index layer having the refractive index at the wavelength of 500 nm of lower than 1.6, the optical multilayer includes a repeated layered structure expressed by the repeat of (LMHML)^n (n is a natural number of 1 or more) where the high-refractive index layer is H, the middle-refractive index layer is M, and the low-refractive index layer is L, the optical multilayer includes the transmission band where the mean transmittance is 85% or higher in the wavelength range of 400 nm to 700 nm and the stopband having the width of 100 nm to 280 nm where the mean transmittance is 10% or lower in the wavelength range of 750 nm to 1100 nm, and the high-refractive index layer, the middle-refractive index layer, and the low-refractive index layer are stacked so that, where the QWOT of the high-refractive index layer of the optical multilayer is $T_H$, the QWOT of the middle-refractive index layer is $T_M$, and the QWOT of the low-refractive index layer is $T_L$, in the case where the refractive index of the middle-refractive index layer is equal to or higher than the intermediate value between the refractive index of the high-refractive index layer and the refractive index of the low-refractive index layer, when the maximum value of $2T_L/(T_H+2T_M)$ in which there is no part where the transmittance locally decreases by 5% or more in the wavelength range of 400 nm to 700 nm in the spectral characteristics under the vertical incident condition is set to 100% and the minimum value thereof is set to 0%, $2T_L/(T_H+2T_M)$ falls within the range of 100% to 70%, and in the case where the refractive index of the middle-refractive index layer is lower than the intermediate value between the refractive index of the high-refractive index layer and the refractive index of the low-refractive index layer, when the maximum value of $(2T_L+2T_M)/T_H$ in which there is no part where the transmittance locally decreases by 5% or more in the wavelength range of 400 nm to 700 nm in the spectral characteristics under the vertical incident condition is set to 100% and the minimum value thereof is set to 0%, $(2T_L+2T_M)/T_H$ falls within the range of 100% to 70%, whereby a near-infrared cut filter in which a ripple is suppressed can be provided.

DETAILED DESCRIPTION

First Embodiment

Figure 1:
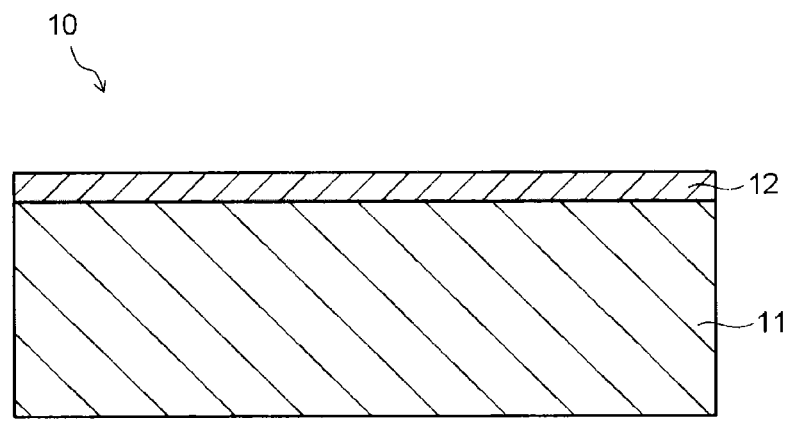
FIG. 1 is a cross-sectional view of a near-infrared cut filter according to a first embodiment.
Figure 2:
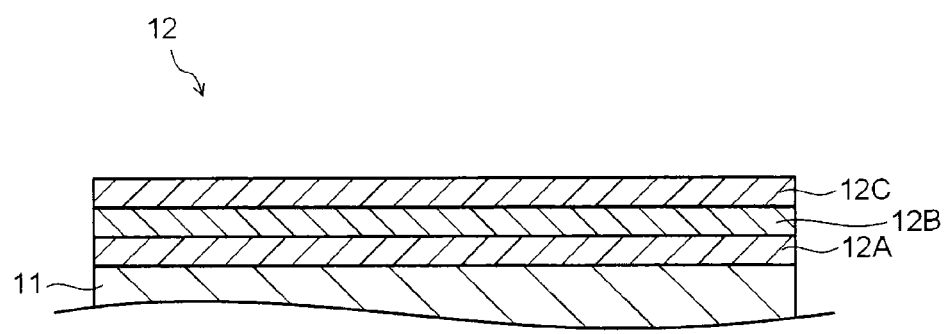
FIG. 2 is a cross-sectional view of an optical multilayer according to the first embodiment.
Figure 3:
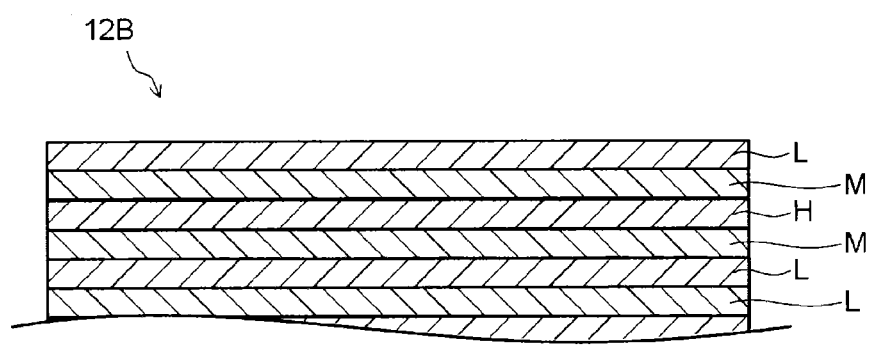
FIG. 3 is a cross-sectional view of a first SWPF part of the optical multilayer according to the first embodiment.

FIG. 1 is a cross-sectional view of a near-infrared cut filter 10 (hereinafter, IRCF 10) according to a first embodiment. FIG. 2 is a cross-sectional view of an optical multilayer 12 included in the IRCF 10. FIG. 3 is a cross-sectional view of a first SWPF part 12B of the optical multilayer 12. Hereinafter, the structure of the IRCF 10 will be described referring to FIG. 1 to FIG. 3.

As illustrated in FIG. 1, the IRCF 10 includes a transparent substrate 11, and the optical multilayer 12 provided on at least one of principal surfaces of the transparent substrate 11. Note that the optical multilayer 12 may be provided on one of the principal surfaces of the transparent substrate 11 or may be dividedly provided on both of the principal surfaces of the transparent substrate 11 respectively.

(Transparent Substrate 11)

The material of the transparent substrate 11 is not particularly limited as long as it can transmit at least light in a visible wavelength region. Examples of the material of the transparent substrate 11 include glass, crystals such as quartz, lithium niobate and sapphire, polyester resins such as polyethylene terephthalate (PET) and polybutylene terephthalate (PBT), polyolefin resins such as polyethylene, polypropylene and ethylene-vinyl acetate copolymer, acrylic resins such as a norbornene resin, polyacrylate and polymethyl methacrylate, a urethane resin, a vinyl chloride resin, a fluorocarbon resin, a polycarbonate resin, a polyvinyl butyral resin, a polyvinyl alcohol resin and so on.

A transparent substrate 11 that absorbs light in a near-infrared wavelength region is particularly preferable. This is because an image quality close to human visibility characteristics can be obtained by using the transparent substrate 11 that absorbs the light in the near-infrared wavelength region. Note that an example of the transparent substrate 11 that absorbs the light in the near-infrared wavelength region is an absorption-type glass made by adding $Cu^{2+}$ (ion) to fluorophosphate-based glass or phosphate-based glass. Further, the one made by adding an absorbent that absorbs the near-infrared light into a resin material may be used. Examples of the absorbent include dye, pigment, a metal complex-based compound, and concretely include a phthalocyanine-based compound, a naphthalocyanine-based compound, and a dithiol metal complex-based compound.

(Structure of Optical Multilayer 22)

FIG. 2 is a cross-sectional view of the optical multilayer 12. As illustrated in FIG. 2, the optical multilayer 12 includes a UV cut part 12A that cuts ultraviolet light (UV), the first SWPF part 12B, and a second SWPF part 12C. The first SWPF part 12B and the second SWPF part 12C form a transmission band where a mean transmittance is 85% or higher in a wavelength range of 400 nm to 700 nm, and a stopband having a width of 100 nm to 280 nm where a mean transmittance is 10% or lower in a wavelength range of 750 nm to 1100 nm on the near-infrared side of the transmission band. In addition, a layer that adjusts the spectral characteristics may be added to the structure of the optical multilayer 12.

(UV Cur Part 12A)

The UV cut part 12A may have any layer configuration as long as it cuts ultraviolet light in a wavelength range of less than 400 nm at predetermined wavelength width and transmittance. For example, the UV cut part 12A has a structure in which a high-refractive index layer H having a refractive index at a wavelength of 500 nm of 2.0 or higher and a low-refractive index layer L having a refractive index at the wavelength of 500 nm of lower than 1.6 are stacked.

(SWPF Part 12B)

FIG. 3 is a cross-sectional view of the first SWPF (short wide pass filter) part 12B. The SWPF part 12B has a structure expressed by the following Expression (1) where a high-refractive index layer having the refractive index at the wavelength of 500 nm of 2.0 or higher is H, a middle-refractive index layer having a refractive index at the wavelength of 500 nm of 1.6 or higher and lower than the refractive index of the high-refractive index layer H is M, and a low-refractive index layer having the refractive index at the wavelength of 500 nm of lower than 1.6 is L.

$$(LMHML)\hat{\ }n \text{ (n is a natural number of 1 or more)} \tag{1}$$

The respective layers are stacked so that, where a QWOT of the high-refractive index layer H of the SWPF part 12B is $T_H$, a QWOT of the middle-refractive index layer M is $T_M$, and a QWOT of the low-refractive index layer L is $T_L$, in a case where the refractive index of the middle-refractive index layer is equal to or higher than an intermediate value between the refractive index of the high-refractive index layer and the refractive index of the low-refractive index layer, when a maximum value of $2T_L/(T_H+2T_M)$ in which there is no part where the transmittance locally decreases by 5% or more in the wavelength range of 400 nm to 700 nm in spectral characteristics under an incident condition of 0° (vertical incidence) is set to 100% and a minimum value thereof is set to 0%, $2T_L/(T_H+2T_M)$ falls within a range of 100% to 70%.

Further, the respective layers are stacked so that, where a QWOT of the high-refractive index layer H of the SWPF part 12B is $T_H$, a QWOT of the middle-refractive index layer M is $T_M$, and a QWOT of the low-refractive index layer L is $T_L$, in a case where the refractive index of the middle-refractive index layer is lower than the intermediate value between the refractive index of the high-refractive index layer and the refractive index of the low-refractive index layer, when a maximum value of $(2T_L+2T_M)/T_H$ in which there is no part where the transmittance locally decreases by 5% or more in the wavelength range of 400 nm to 700 nm in spectral characteristics under the incident condition of 0° is set to 100% and a minimum value thereof is set to 0%, $(2T_L+2T_M)/T_H$ falls within a range of 100% to 70%.

At the time of deciding the ratio among the above-descried QWOTs of the respective layers, the refractive index of the middle-refractive index layer defines the intermediate value between the refractive index of the high-refractive index layer and the refractive index of the low-refractive index layer as a threshold value. This is because if the refractive index of the middle-refractive index layer is equal to or higher than the intermediate value between the refractive index of the high-refractive index layer and the refractive index of the low-refractive index layer, the effect of an increase or decrease in the QWOT of the middle-refractive index layer on the above-described ratio is the same as the tendency of the high-refractive index layer. Further, if the refractive index of the middle-refractive index layer is lower than the intermediate value between the refractive index of the high-refractive index layer and the refractive index of the low-refractive index layer, the effect of an increase or decrease in the QWOT of the middle-refractive index layer on the above-described ratio is the same as the tendency of the low-refractive index layer.

The reasons of setting the QWOTs of the respective layers of the SWPF part 12B as described above will be described below. Occurrence of a local transmittance decrease (a so-called ripple) in a visible region depending on an incident angle on the optical multilayer can be considered to be attributed to the difference in decrease of optical thickness by nd×cos θ among the layers with different refractive indexes. As for the spectral characteristics of the optical multilayer, it is found that the incident angle is smaller in a layer with a higher refractive index and the incident angle is larger in a layer with a lower refractive index by Snell's law (n1×cos θ1=n2×cos θ2).

Therefore, considering, for example, the high-refractive index layer H and the low-refractive index layer L, with an increase in the incident angle, the optical thickness of the high-refractive index layer acts too much and the optical thickness of the low-refractive index layer acts too little in the balance between the optical thicknesses thereof. Further, the SWPF tends to cause a ripple due to the change in thickness for each refractive index. However, there is always a ratio range in which no ripple occurs even when the ratio among the optical thicknesses for each refractive index is changed, and hence it is possible to suppress the ripple using such ratio range.

More specifically, in the SWPF having the repeated layered structure of (LMHML), the QWOTs of the refractive index layers are increased or decreased and the occurrence of a ripple is checked in the wavelength range of 400 nm to 700 nm in spectral characteristics under the incident condition of 0° for the SWPF. By increasing or decreasing the QWOTs of the refractive index layers, the range where a ripple begins to occur can be grasped.

Then, the QWOTs of the refractive index layers are decided so that in the case where the refractive index of the middle-refractive index layer is equal to or higher than the intermediate value between the refractive index of the high-refractive index layer and the refractive index of the low-refractive index layer, when the maximum value of $2T_L/(T_H+2T_M)$ in which there is no part where the transmittance locally decreases by 5% or more is set to 100% and the minimum value thereof is set to 0%, $2T_L/(T_H+2T_M)$ falls within the range of 100% to 70%.

Further, the QWOTs of the refractive index layers are decided so that in the case where the refractive index of the middle-refractive index layer is lower than the intermediate value between the refractive index of the high-refractive index layer and the refractive index of the low-refractive index layer, when the maximum value of $(2T_L+2T_M)/T_H$ in which there is no part where the transmittance locally decreases by 5% or more is set to 100% and the minimum value thereof is set to 0%, $(2T_L+2T_M)/T_H$ falls within the range of 100% to 70%.

Note that that there is no part where the transmittance locally decreases by 5% or more is to define the amount of change in the transmittance when the QWOTs of the refractive index layers are increased or decreased in the wavelength range of 400 nm to 700 nm. More specifically, since the transmittance is changed by the adjustment of the QWOTs of the refractive index layers, the above-described ratio among the QWOTs in the range in which there is no part where the amount of change in transmittance locally decreases by 5% or more is checked, and the maximum value and the minimum value are set.

In the above, selection of a value of 100% results in a design in which no ripple occurs up to a largest angle when the incident angle is increased (tilted) from 0°. Selection of a value of less than 70% results in occurrence of a ripple at an angle smaller than that in the case of selecting the value of 100% when the incident angle is increased (tilted) from 0°. The QWOTs of the refractive index layers are decided to fall within the range of 100% to 70% thereof, in consideration of the margin of manufacture and the occurrence of the ripple under an incident condition of 0° to 45° in the transmission band (400 nm to 700 nm) of the optical multilayer. Note that the process of deciding the above-described QWOTs of the refractive index layers may be performed by actually fabricating the optical multilayer including a plurality of layers or may be performed by utilizing software capable of simulating the spectral characteristics of the optical multilayer from a layer configuration.

(SWPF Part 12C)

The SWPF part 12C has the same structure as that of the SWPF part 12B and therefore repeated description will be omitted.

The high-refractive index layer H is not particularly limited as long as it is made of a material having a refractive index of 2.0 or higher at the wavelength of 500 nm. Preferable examples of the material with such high refractive index include titanium oxide ($TiO_2$), niobium oxide ($Nb_2O_5$) and a composite oxide thereof. Further, if the refractive index is 2.0 or higher, the material may contain an additive. Note that the material with a higher refractive index is more advantageous for suppressing the amount of wavelength shift at oblique incidence, expansion of the stopband and so on.

The middle-refractive index layer M is not particularly limited as long as it is made of a material having a refractive index of 1.6 or higher and lower than the refractive index of the high-refractive index layer H at the wavelength of 500 nm. Preferable examples of the material with such middle-refractive index include tantalum oxide ($Ta_2O_5$), aluminum oxide ($Al_2O_3$), yttrium oxide ($Y_2O_3$), and a mixture of zirconium oxide ($ZrO_2$) and aluminum oxide ($Al_2O_3$). Note that the above-described material may contain an additive.

The low-refractive index layer L is not particularly limited as long as it is made of a material having a refractive index of lower than 1.6 at the wavelength of 500 nm. A preferable example of the material with such low refractive index includes silicon oxide ($SiO_2$). Further, if the refractive index is lower than 1.6, the material may contain an additive.

Preferable examples of combination of the refractive index layers include the followings.

Combination 1 . . . The high-refractive index layer: titanium oxide (refractive index at the wavelength of 500 nm: 2.47), the middle-refractive index layer: tantalum oxide (refractive index at the wavelength of 500 nm: 2.19), and the low-refractive index layer: silicon oxide (refractive index at the wavelength of 500 nm: 1.48)

Note that a preferable range of $2T_L/(T_H+2T_M)$ in this combination is 0.870 to 0.845.

Combination 2 . . . The high-refractive index layer: titanium oxide (refractive index at the wavelength of 500 nm: 2.47), the middle-refractive index layer: aluminum oxide (refractive index at the wavelength of 500 nm: 1.64), and the low-refractive index layer: silicon oxide (refractive index at the wavelength of 500 nm: 1.48)

Note that a preferable range of $(2T_L+2T_M)/T_H$ in this combination is 1.215 to 1.186.

Combination 3 . . . The high-refractive index layer: niobium oxide (refractive index at the wavelength of 500 nm: 2.38), the middle-refractive index layer: aluminum oxide (refractive index at the wavelength of 500 nm: 1.64), and the low-refractive index layer: silicon oxide (refractive index at the wavelength of 500 nm: 1.48)

Note that a preferable range of $(2T_L+2T_M)/T_H$ in this combination is 1.229 to 1.186.

The high-refractive index layer H, the middle-refractive index layer M, and the low-refractive index layer L constituting the optical multilayer 12 can be formed by the sputtering method, the vacuum deposition method, the ion beam method, the ion plating method, or the CVD method, and can preferably formed by the sputtering method or the vacuum deposition method. The transmission band is a wavelength band utilized for receiving light by a solid-state imaging device such as a CCD, a CMOS or the like, and the layer thickness accuracy of the layers is important. The sputtering method and the vacuum deposition method are excellent in layer thickness control when forming a thin layer. Therefore, it is possible to increase the accuracy of the layer thicknesses of the high-refractive index layer H, the middle-refractive index layer M, and the low-refractive index layer L constituting the optical multilayer 12, and hence the ripple can be suppressed.

Note that, other than the layers constituting the optical multilayer 12, layers such as an adherence enhancing layer and an antistatic layer on an uppermost surface layer (on the air side) may be included in the optical multilayer 12.

(Spectral Characteristics of Optical Multilayer 12)

Next, the spectral characteristics of the optical multilayer 12 will be described. The optical multilayer 12 includes the transmission band where the mean transmittance is 85% or higher in the wavelength range of 400 nm to 700 nm and the stopband on the near-infrared side of the transmission band under the incident condition of 0°. The stopband has the region with the width of 100 nm to 280 nm where the mean transmittance is 10% or lower in the wavelength range of 750 nm to 1100 nm.

A difference between a half-power wavelength on the ultraviolet side and a half-power wavelength on the near-infrared side of the transmission band of the optical multilayer 12 is 200 nm or more. Further, a difference between half-power wavelengths of the transmission band of the optical multilayer 12 under the incident condition of 0° and under the incident condition of 30° is less than 10 nm on the ultraviolet side and less than 22 nm on the near-infrared side.

Note that the optical multilayer 12 preferably satisfies the following requirements in the spectral characteristics under the incident condition of 0°. More specifically, the difference between the half-power wavelength on the ultraviolet side and the half-power wavelength on the near-infrared side of the transmission band of the optical multilayer 12 is preferably 350 nm or less, and more preferably 300 nm or less. Further, the half-power wavelength on the ultraviolet side preferably falls within a range of 390 nm to 430 nm, and the half-power wavelength on the near-infrared side preferably falls within a range of 640 nm to 720 nm. Further, the width of the stopband on the ultraviolet side is preferably 30 nm or more, and the width of the stopband on the near-infrared side is preferably 200 nm or more.

Here, the range (range for obtaining the mean transmittance) of the transmission band of the optical multilayer 12 is from a wavelength (base point on the ultraviolet side) when the decrease in transmittance starts from the transmission band toward the stopband on the ultraviolet side to a wavelength (base point on the near-infrared side) when the decrease in transmittance starts from the transmission band toward the stopband on the near-infrared side.

Further, as for the range (range for obtaining the mean transmittance and the width) of the stopband of the optical multilayer 12, the range of the stopband on the ultraviolet side of the optical multilayer 12 is from a wavelength (base point on the transmission band side) when the increase in transmittance starts from the stopband on the ultraviolet side toward the transmission band to a wavelength (base point on the ultraviolet side) when the increase in transmittance, at the time when the transmittance reaches 40% at the first time toward the ultraviolet side, starts.

Further, the range of the stopband on the near-infrared side of the optical multilayer 12 is from a wavelength (base point on the transmission band side) when the increase in transmittance starts from the stopband on the near-infrared side toward the transmission band to a wavelength (base point on the near-infrared side) when the increase in transmittance, at the time when the transmittance reaches 40% at the first time toward the near-infrared side, starts.

(Spectral Characteristics of Near-Infrared Cut Filter (IRCF) 10)

The IRCF 10 preferably has no part where the transmittance in the transmission band (in the wavelength range of 400 nm to 700 nm) locally decreases by 20% or more in spectral characteristics under the incident condition of 0° to 45°. Since the spectral characteristics of the IRCF 10 depend on mainly the spectral characteristics of the optical multilayer 12, the above-described characteristics are preferably provided only by the optical multilayer 12, and the above-described characteristics may be provided by providing an anti-reflection layer or the like, in addition to the optical multilayer 12, on the other surface of the transparent substrate. As for the IRCF 10, in spectral characteristics under the incident condition of 0° to 45°, the amount of locally decrease in transmittance in the transmission band (in a wavelength of 400 nm to 700 nm) is more preferably 15% or less, and further more preferably 12% or less.

Note that, in the embodiment, the amount of locally decrease in transmittance means a local transmittance loss amount due to the ripple. More specifically, in the variation in transmittance from a short wavelength side toward a long wavelength side, the amount of locally decrease in transmittance means a larger one of an absolute value of (A)-(B) and (C)-(B) where a transmittance at a first inflection point from a flat portion or a similar continuous transmittance variation portion (for example, the transmission band of the absorbing glass shows a gentle mount shape) of the transmission band toward a minimum value formed by a ripple is (A), a minimum value of the transmittance by the ripple is (B), and a transmittance at a first inflection point that is the end of an increase in transmittance increasing from the minimum value by the ripple to the above-described flat portion and returns the transmittance to the flat portion is (C).

Other Embodiments

The present invention has been described in detail based on the above concrete example as described above, but the present invention is not limited to the above concrete example and every change and modification can be made without departing from the scope of the present invention.

For example, the optical multilayer may include two SWPFs having same layer configuration, or may include one SWPF and an SWPF having another layer configuration (other than the above-described repeated layered structure).

More specifically, the optical multilayer may be composed of an SWPF including the repeated layered structure of (LMHML) and an SWPF including a repeated layered structure of (HL). The repeating number of (LMHML) is arbitrarily set according to the desired spectral characteristics. Further, substantially the same layer configuration may be made by using a configuration (equivalent layer configuration) in which the middle-refractive index layer of (LMHML) is distributed to the high-refractive index layer and the low-refractive index layer.

(Imaging Apparatus 100)

The IRCF 10 described referring to FIG. 1 to FIG. 3 is used as, for example, a luminosity factor correction filter in imaging apparatuses such as a digital still camera, a digital video camera, a monitoring camera, a camera for automobile use and a web camera, an automatic exposure meter and the like. In the imaging apparatuses such as a digital still camera, a digital video camera, a monitoring camera, a camera for automobile use and a web camera, the IRCF 10 is disposed, for example, between an imaging lens and a solid-state imaging device. In the automatic exposure meter, the IRCF 10 is disposed, for example, at the front surface of a light-receiving element.

In the imaging apparatus, the IRCF 10 may be disposed at a position away from the front surface of the solid-state imaging device or may be directly attached to the solid-state imaging device or a package of the solid-state imaging device, or a cover that protects the solid-state imaging device may be composed of the IRCF 10. Further, the IRCF 10 may be directly attached to a low-pass filter using crystals such as quartz, lithium niobate and the like for suppressing moire and false color.

Figure 4:
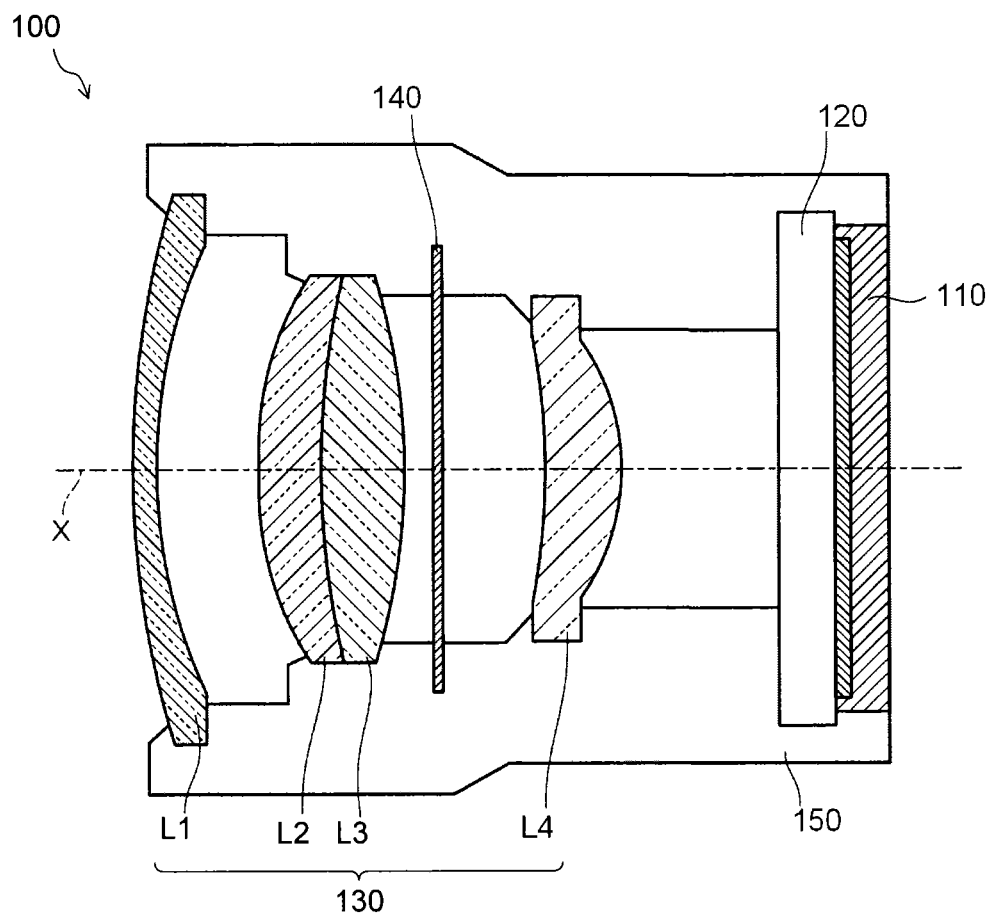
FIG. 4 is a partial configuration view of an imaging apparatus.

Next, a concrete example will be illustrated. FIG. 4 is a partial configuration view of the imaging apparatus 100. The imaging apparatus 100 is, for example, a digital still camera, a digital video camera, a monitoring camera, a camera for automobile use, or a web camera. The imaging apparatus 100 includes a solid-state imaging device 110, a cover glass 120, a lens group 130, a diaphragm 140, and a housing 150. The solid-state imaging device 110, the cover glass 120, the lens group 130, and the diaphragm 140 are arranged along an optical axis x.

The solid-state imaging device 110 is, for example, a charge coupled device (CCD) image sensor or a complementary metal oxide semiconductor (CMOS) image sensor. The solid-state imaging device 110 converts inputted light to an electric signal and then outputs the signal to a not-illustrated image signal processing circuit.

The cover glass 120 is disposed on an imaging plane side (lens group 130 side) of the solid-state imaging device 110 to protect the solid-state imaging device 110 against the external environment.

The lens group 130 is disposed on the imaging plane side of the solid-state imaging device 110. The lens group 130 includes a plurality of lenses L1 to L4 and guides light incident thereon to the imaging plane of the solid-state imaging device 110.

The diaphragm 140 is disposed between the lens L3 and the lens L4 of the lens group 130. The diaphragm 140 is configured to be able to adjust the amount of light passing therethrough.

The housing 150 houses the solid-state imaging device 110, the cover glass 120, the lens group 130 and the diaphragm 140.

In the imaging apparatus 100, light incident thereon from an object side passes through the lens L1, the lens L2, the third lens L3, the diaphragm 140, the lens L4 and the cover glass 120, and then enters the solid-state imaging device 110. The incident light is converted by the solid-state imaging device 110 to an electric signal, which is outputted as an image signal.

The IRCF 10 is used, for example, as the cover glass 120 and the lens group 130, namely, the lens L1, the lens L2, the lens L3, and the lens L4. In other words, the optical multilayer 12 of the IRCF 10 is provided on the surface of the transparent substrate 11 that constitutes the cover glass or the lens group of the conventional imaging apparatus. Further, the IRCF 10 (not illustrated in FIG. 4) in which the optical multilayer 12 is provided on the surface of the transparent substrate 11 may be provided as a member separate from the above-described cover glass and lens group.

Applying the IRCF 10 to the cover glass 120 or the lens group 130 of the imaging apparatus 100 makes it possible to expand the transmission band in the visible region and the stopbands in the ultraviolet region and the near-infrared region while suppressing the dependence on the incident angle (the occurrence of ripple), thereby improving the characteristics thereof.

EXAMPLES

Next, concrete description will be made referring to Examples. Near-infrared cut filters (IRCFs) according to Examples each include a transparent substrate (high transparency glass, B270, plate thickness of 0.3 mm, manufactured by Schott AG), and an optical multilayer provided on one surface of the transparent substrate. For the IRCFs, the conditions of the optical multilayer under which there is no part where the transmittance locally decreases by 5% or more in the wavelength range of 400 nm to 700 nm in spectral characteristics under the incident condition of 0° were investigated using optical thin layer simulation software (TFCalc, manufactured by Software Spectra Inc.). Further, the refractive indexes of the respective layers at the wavelength of 500 nm are used as representative values in the present application, but simulations were made in consideration of the wavelength dependence of the refractive indexes in the simulations.

The refractive index has wavelength dependence called dispersion or the like. For example, in a wavelength range of 300 nm to 1300 nm, there is a tendency that the refractive index is higher as the wavelength is shorter and the refractive index is smaller as the wavelength is longer, for the layer materials that are targets of the present application. The wavelength-refractive index relationship is often expressed not using a linear relationship but generally using an approximate expression such as Hartmann, Sellmeier. Further, the refractive index (dispersion) of the layer material varies depending on various layer formation conditions. Therefore, layer formation was actually performed by the vapor deposition method, the ion assisted deposition method, the sputtering method and the like, and obtained dispersion data of the refractive indexes of the respective layers was used for the following simulations.

Example 1

The optical multilayer is a repeated stack of nine layers of (LMHML) composed of titanium oxide (high-refractive index layer), tantalum oxide (middle-refractive index layer) and silicon oxide (low-refractive index layer). Further, the optical multilayer includes the transmission band where the mean transmittance is 85% or higher in the wavelength range of 400 nm to 700 nm, and the stopband of the region where the mean transmittance is 10% or lower in a wavelength range of 780 nm to 1000 nm on the near-infrared side of the transmission band. For the optical multilayer, layer configurations at 100% (maximum value), 0% (minimum value), 70% of $2T_L/(T_H+2T_M)$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $2T_L/(T_H+2T_M)$ in which there is no part where the transmittance of the optical multilayer locally decreases by 5% or more are listed in the following Table 1. 100% (maximum value) of $2T_L/(T_H+2T_M)$ was 0.867, 0% (minimum value) thereof was 0.816, and 70% thereof was 0.852.

100% to 70%, the optical multilayer can suppress the ripple in the transmission band in the wavelength range of 400 nm to 700 nm even under the incident condition of 45° and its local decrease in transmittance is as low as 9.9%. Further, it is found that when $2T_L/(T_H+2T_M)$ is 0%, the local decrease in the transmission band in spectral characteristics under the incident condition of 45° is 22.2% and the ripple cannot be sufficiently suppressed.

Example 2

The optical multilayer has the same repeated layered structure as that in Example 1 and is different only in that the optical multilayer has a stopband of a region where the mean transmittance is 10% or lower in a wavelength range of 920 nm to 1170 nm on the near-infrared side of the transmission band. For the optical multilayer, layer configurations at

TABLE 1

| | | @Wavelength | 100% | | 70% | | 0% | |
| --- | --- | --- | --- | --- | --- | --- | --- | --- |
| Layer number | Layer material | 500 nm Refractive index | Layer thickness [nm] | QWOT | Layer thickness [nm] | QWOT | Layer thickness [nm] | QWOT |
| 1 | SiO$_2$ | 1.48 | 70.54 | 0.835 | 69.87 | 0.827 | 68.27 | 0.808 |
| 2 | Ta$_2$O$_5$ | 2.19 | 36.64 | 0.642 | 36.92 | 0.647 | 37.66 | 0.660 |
| 3 | TiO$_2$ | 2.47 | 32.58 | 0.644 | 32.83 | 0.649 | 33.49 | 0.662 |
| 4 | Ta$_2$O$_5$ | 2.19 | 36.64 | 0.642 | 36.92 | 0.647 | 37.66 | 0.660 |
| 5 | SiO$_2$ | 1.48 | 141.08 | 1.670 | 139.74 | 1.655 | 136.53 | 1.617 |
| 6 | Ta$_2$O$_5$ | 2.19 | 36.64 | 0.642 | 36.92 | 0.647 | 37.66 | 0.660 |
| 7 | TiO$_2$ | 2.47 | 32.58 | 0.644 | 32.83 | 0.649 | 33.49 | 0.662 |
| 8 | Ta$_2$O$_5$ | 2.19 | 36.64 | 0.642 | 36.92 | 0.647 | 37.66 | 0.660 |
| 9 | SiO$_2$ | 1.48 | 141.08 | 1.670 | 139.74 | 1.655 | 136.53 | 1.617 |
| 10 | Ta$_2$O$_5$ | 2.19 | 36.64 | 0.642 | 36.92 | 0.647 | 37.66 | 0.660 |
| 11 | TiO$_2$ | 2.47 | 32.58 | 0.644 | 32.83 | 0.649 | 33.49 | 0.662 |
| 12 | Ta$_2$O$_5$ | 2.19 | 36.64 | 0.642 | 36.92 | 0.647 | 37.66 | 0.660 |
| 13 | SiO$_2$ | 1.48 | 141.08 | 1.670 | 139.74 | 1.655 | 136.53 | 1.617 |
| 14 | Ta$_2$O$_5$ | 2.19 | 36.64 | 0.642 | 36.92 | 0.647 | 37.66 | 0.660 |
| 15 | TiO$_2$ | 2.47 | 32.58 | 0.644 | 32.83 | 0.649 | 33.49 | 0.662 |
| 16 | Ta$_2$O$_5$ | 2.19 | 36.64 | 0.642 | 36.92 | 0.647 | 37.66 | 0.660 |
| 17 | SiO$_2$ | 1.48 | 141.08 | 1.670 | 139.74 | 1.655 | 136.53 | 1.617 |
| 18 | Ta$_2$O$_5$ | 2.19 | 36.64 | 0.642 | 36.92 | 0.647 | 37.66 | 0.660 |
| 19 | TiO$_2$ | 2.47 | 32.58 | 0.644 | 32.83 | 0.649 | 33.49 | 0.662 |
| 20 | Ta$_2$O$_5$ | 2.19 | 36.64 | 0.642 | 36.92 | 0.647 | 37.66 | 0.660 |
| 21 | SiO$_2$ | 1.48 | 141.08 | 1.670 | 139.74 | 1.655 | 136.53 | 1.617 |
| 22 | Ta$_2$O$_5$ | 2.19 | 36.64 | 0.642 | 36.92 | 0.647 | 37.66 | 0.660 |
| 23 | TiO$_2$ | 2.47 | 32.58 | 0.644 | 32.83 | 0.649 | 33.49 | 0.662 |
| 24 | Ta$_2$O$_5$ | 2.19 | 36.64 | 0.642 | 36.92 | 0.647 | 37.66 | 0.660 |
| 25 | SiO$_2$ | 1.48 | 141.08 | 1.670 | 139.74 | 1.655 | 136.53 | 1.617 |
| 26 | Ta$_2$O$_5$ | 2.19 | 36.64 | 0.642 | 36.92 | 0.647 | 37.66 | 0.660 |
| 27 | TiO$_2$ | 2.47 | 32.58 | 0.644 | 32.83 | 0.649 | 33.49 | 0.662 |
| 28 | Ta$_2$O$_5$ | 2.19 | 36.64 | 0.642 | 36.92 | 0.647 | 37.66 | 0.660 |
| 29 | SiO$_2$ | 1.48 | 141.08 | 1.670 | 139.74 | 1.655 | 136.53 | 1.617 |
| 30 | Ta$_2$O$_5$ | 2.19 | 36.64 | 0.642 | 36.92 | 0.647 | 37.66 | 0.660 |
| 31 | TiO$_2$ | 2.47 | 32.58 | 0.644 | 32.83 | 0.649 | 33.49 | 0.662 |
| 32 | Ta$_2$O$_5$ | 2.19 | 36.64 | 0.642 | 36.92 | 0.647 | 37.66 | 0.660 |
| 33 | SiO$_2$ | 1.48 | 141.08 | 1.670 | 139.74 | 1.655 | 136.53 | 1.617 |
| 34 | Ta$_2$O$_5$ | 2.19 | 36.64 | 0.642 | 36.92 | 0.647 | 37.66 | 0.660 |
| 35 | TiO$_2$ | 2.47 | 32.58 | 0.644 | 32.83 | 0.649 | 33.49 | 0.662 |
| 36 | Ta$_2$O$_5$ | 2.19 | 36.64 | 0.642 | 36.92 | 0.647 | 37.66 | 0.660 |
| 37 | SiO$_2$ | 1.48 | 70.54 | 0.835 | 69.87 | 0.827 | 68.27 | 0.808 |

Figure 5:
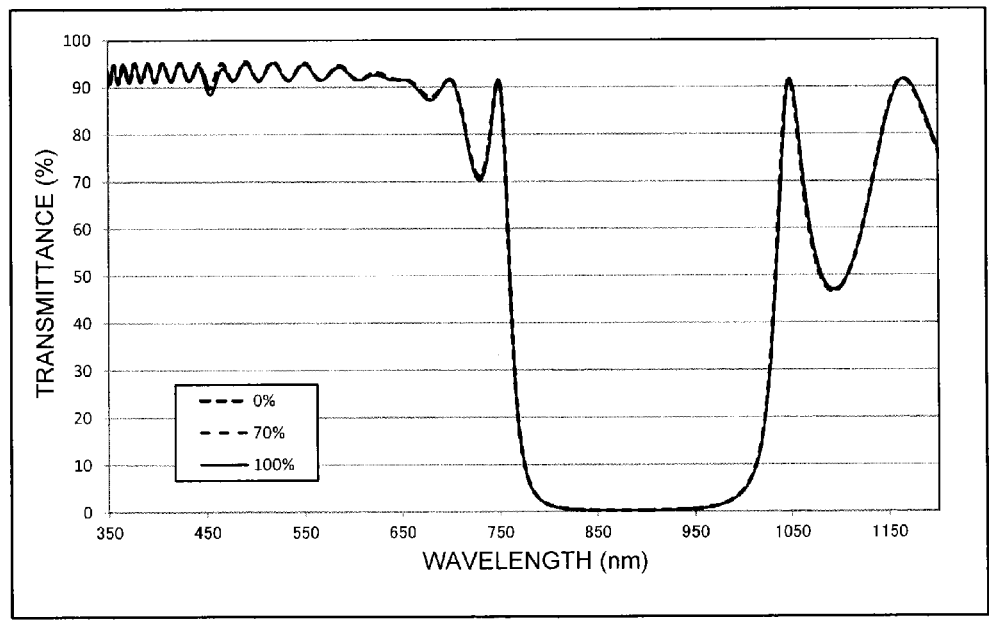
FIG. 5 is a graph illustrating simulation results of spectral characteristics under an incident condition of 0° of an optical multilayer listed in Table 1.
Figure 6:
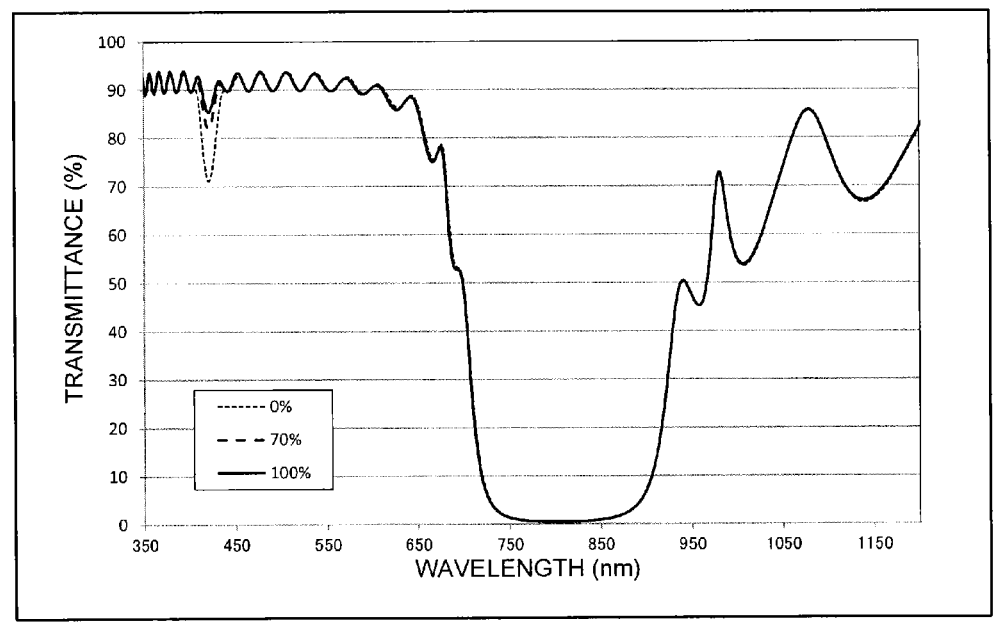
FIG. 6 is a graph illustrating simulation results of spectral characteristics under an incident condition of 45° of the optical multilayer listed in Table 1.

FIG. 5 is a graph illustrating the simulation results of spectral characteristics under the incident condition of 0° of the optical multilayer listed in Table 1. Further, FIG. 6 is a graph illustrating the simulation results of spectral characteristics under an incident condition of 45° of the optical multilayer listed in Table 1. From the above, it is found that in the case where the maximum value and the minimum value of $2T_L/(T_H+2T_M)$ in which there is no part where the transmittance locally decreases by 5% or more in the wavelength range of 400 nm to 700 nm in spectral characteristics under the incident condition of 0° are set to 100% and 0% respectively, when $2T_L/(T_H+2T_M)$ falls within the range of 100% (maximum value), 0% (minimum value), 70% of $2T_L/(T_H+2T_M)$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $2T_L/(T_H+2T_M)$ in which there is no part where the transmittance of the optical multilayer locally decreases by 5% or more are listed in the following Table 2. 100% (maximum value) of $2T_L/(T_H+2T_M)$ was 0.865, 0% (minimum value) thereof was 0.807, and 70% thereof was 0.847.

TABLE 2

| Layer number | Layer material | 500 nm Refractive index | 100% Layer thickness [nm] | QWOT | 70% Layer thickness [nm] | QWOT | 0% Layer thickness [nm] | QWOT |
|---|---|---|---|---|---|---|---|---|
| 1 | $SiO_2$ | 1.48 | 87.99 | 1.042 | 87.06 | 1.031 | 84.79 | 1.004 |
| 2 | $Ta_2O_5$ | 2.19 | 45.81 | 0.803 | 46.27 | 0.811 | 47.29 | 0.829 |
| 3 | $TiO_2$ | 2.47 | 40.73 | 0.805 | 41.14 | 0.813 | 42.05 | 0.831 |
| 4 | $Ta_2O_5$ | 2.19 | 45.81 | 0.803 | 46.27 | 0.811 | 47.29 | 0.829 |
| 5 | $SiO_2$ | 1.48 | 175.98 | 2.084 | 174.12 | 2.062 | 169.57 | 2.008 |
| 6 | $Ta_2O_5$ | 2.19 | 45.81 | 0.803 | 46.27 | 0.811 | 47.29 | 0.829 |
| 7 | $TiO_2$ | 2.47 | 40.73 | 0.805 | 41.14 | 0.813 | 42.05 | 0.831 |
| 8 | $Ta_2O_5$ | 2.19 | 45.81 | 0.803 | 46.27 | 0.811 | 47.29 | 0.829 |
| 9 | $SiO_2$ | 1.48 | 175.98 | 2.084 | 174.12 | 2.062 | 169.57 | 2.008 |
| 10 | $Ta_2O_5$ | 2.19 | 45.81 | 0.803 | 46.27 | 0.811 | 47.29 | 0.829 |
| 11 | $TiO_2$ | 2.47 | 40.73 | 0.805 | 41.14 | 0.813 | 42.05 | 0.831 |
| 12 | $Ta_2O_5$ | 2.19 | 45.81 | 0.803 | 46.27 | 0.811 | 47.29 | 0.829 |
| 13 | $SiO_2$ | 1.48 | 175.98 | 2.084 | 174.12 | 2.062 | 169.57 | 2.008 |
| 14 | $Ta_2O_5$ | 2.19 | 45.81 | 0.803 | 46.27 | 0.811 | 47.29 | 0.829 |
| 15 | $TiO_2$ | 2.47 | 40.73 | 0.805 | 41.14 | 0.813 | 42.05 | 0.831 |
| 16 | $Ta_2O_5$ | 2.19 | 45.81 | 0.803 | 46.27 | 0.811 | 47.29 | 0.829 |
| 17 | $SiO_2$ | 1.48 | 175.98 | 2.084 | 174.12 | 2.062 | 169.57 | 2.008 |
| 18 | $Ta_2O_5$ | 2.19 | 45.81 | 0.803 | 46.27 | 0.811 | 47.29 | 0.829 |
| 19 | $TiO_2$ | 2.47 | 40.73 | 0.805 | 41.14 | 0.813 | 42.05 | 0.831 |
| 20 | $Ta_2O_5$ | 2.19 | 45.81 | 0.803 | 46.27 | 0.811 | 47.29 | 0.829 |
| 21 | $SiO_2$ | 1.48 | 175.98 | 2.084 | 174.12 | 2.062 | 169.57 | 2.008 |
| 22 | $Ta_2O_5$ | 2.19 | 45.81 | 0.803 | 46.27 | 0.811 | 47.29 | 0.829 |
| 23 | $TiO_2$ | 2.47 | 40.73 | 0.805 | 41.14 | 0.813 | 42.05 | 0.831 |
| 24 | $Ta_2O_5$ | 2.19 | 45.81 | 0.803 | 46.27 | 0.811 | 47.29 | 0.829 |
| 25 | $SiO_2$ | 1.48 | 175.98 | 2.084 | 174.12 | 2.062 | 169.57 | 2.008 |
| 26 | $Ta_2O_5$ | 2.19 | 45.81 | 0.803 | 46.27 | 0.811 | 47.29 | 0.829 |
| 27 | $TiO_2$ | 2.47 | 40.73 | 0.805 | 41.14 | 0.813 | 42.05 | 0.831 |
| 28 | $Ta_2O_5$ | 2.19 | 45.81 | 0.803 | 46.27 | 0.811 | 47.29 | 0.829 |
| 29 | $SiO_2$ | 1.48 | 175.98 | 2.084 | 174.12 | 2.062 | 169.57 | 2.008 |
| 30 | $Ta_2O_5$ | 2.19 | 45.81 | 0.803 | 46.27 | 0.811 | 47.29 | 0.829 |
| 31 | $TiO_2$ | 2.47 | 40.73 | 0.805 | 41.14 | 0.813 | 42.05 | 0.831 |
| 32 | $Ta_2O_5$ | 2.19 | 45.81 | 0.803 | 46.27 | 0.811 | 47.29 | 0.829 |
| 33 | $SiO_2$ | 1.48 | 175.98 | 2.084 | 174.12 | 2.062 | 169.57 | 2.008 |
| 34 | $Ta_2O_5$ | 2.19 | 45.81 | 0.803 | 46.27 | 0.811 | 47.29 | 0.829 |
| 35 | $TiO_2$ | 2.47 | 40.73 | 0.805 | 41.14 | 0.813 | 42.05 | 0.831 |
| 36 | $Ta_2O_5$ | 2.19 | 45.81 | 0.803 | 46.27 | 0.811 | 47.29 | 0.829 |
| 37 | $SiO_2$ | 1.48 | 87.99 | 1.042 | 87.06 | 1.031 | 84.79 | 1.004 |

Figure 7:
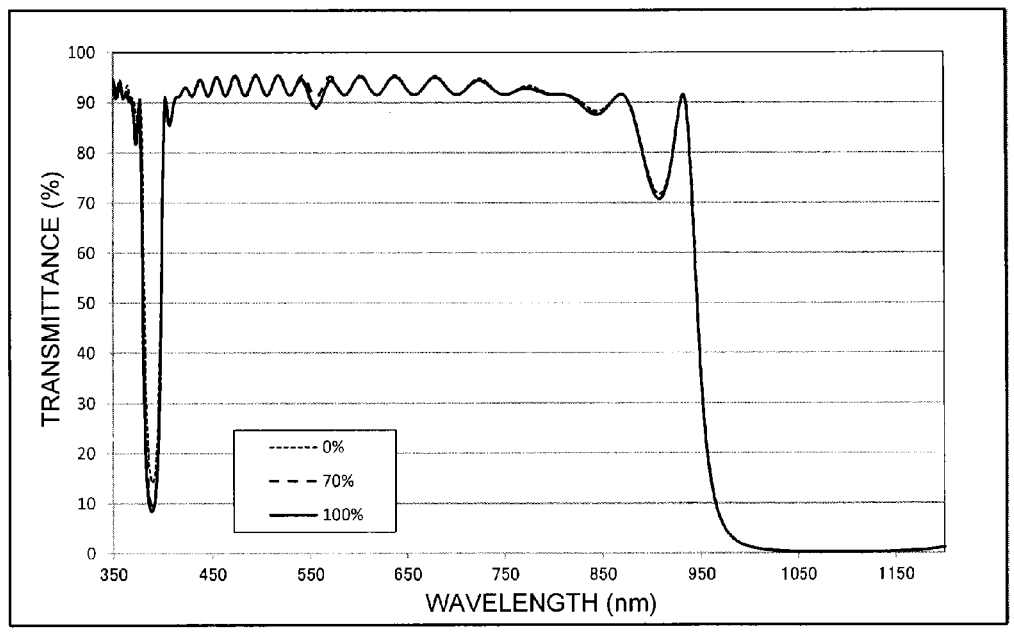
FIG. 7 is a graph illustrating simulation results of spectral characteristics under the incident condition of 0° of an optical multilayer listed in Table 2.
Figure 8:
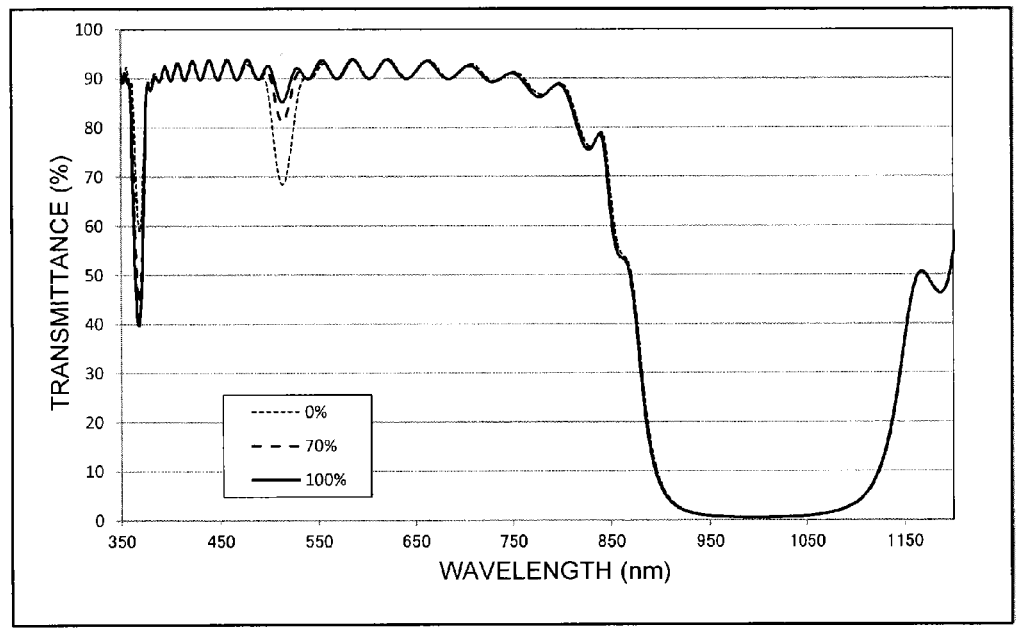
FIG. 8 is a graph illustrating simulation results of spectral characteristics under the incident condition of 45° of the optical multilayer listed in Table 2.

FIG. 7 is a graph illustrating the simulation results of spectral characteristics under the incident condition of 0° of the optical multilayer listed in Table 2. Further, FIG. 8 is a graph illustrating the simulation results of spectral characteristics under the incident condition of 45° of the optical multilayer listed in Table 2. From the above, it is found that in the case where the maximum value and the minimum value of $2T_L/(T_H+2T_M)$ in which there is no part where the transmittance locally decreases by 5% or more in the wavelength range of 400 nm to 700 nm in spectral characteristics under the incident condition of 0° are set to 100% and 0% respectively, when $2T_L/(T_H+2T_M)$ falls within the range of 100% to 70%, the optical multilayer can suppress the ripple in the transmission band in the wavelength range of 400 nm to 700 nm even under the incident condition of 45° and its local decrease in transmittance is as low as 12.4%. Further, it is found that when $2T_L/(T_H+2T_M)$ is 0%, the local decrease in the transmission band in spectral characteristics under the incident condition of 45° is 24.6% and the ripple cannot be sufficiently suppressed.

Example 3

The optical multilayer is a repeated stack of nine layers of (LMHML) composed of titanium oxide (high-refractive index layer), aluminum oxide (middle-refractive index layer) and silicon oxide (low-refractive index layer). Further, the optical multilayer includes the transmission band where the mean transmittance is 85% or higher in the wavelength range of 400 nm to 700 nm, and the stopband of the region where the mean transmittance is 10% or lower in a wavelength range of 770 nm to 1020 nm on the near-infrared side of the transmission band. For the optical multilayer, layer configurations at 100% (maximum value), 0% (minimum value), 70% of $(2T_L+2T_M)/T_H$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $(2T_L+2T_M)/T_H$ in which there is no part where the transmittance of the optical multilayer locally decreases by 5% or more are listed in the following Table 3. 100% (maximum value) of $(2T_L+2T_M)/T_H$ was 1.218, 0% (minimum value) thereof was 1.153, and 70% thereof was 1.197.

TABLE 3

| Layer number | Layer material | @Wavelength 500 nm Refractive index | 100% Layer thickness [nm] | QWOT | 70% Layer thickness [nm] | QWOT | 0% Layer thickness [nm] | QWOT |
|---|---|---|---|---|---|---|---|---|
| 1 | SiO$_2$ | 1.48 | 42.14 | 0.499 | 41.8 | 0.495 | 41.13 | 0.487 |
| 2 | Al$_2$O$_3$ | 1.64 | 38.16 | 0.501 | 37.85 | 0.497 | 37.24 | 0.489 |
| 3 | TiO$_2$ | 2.47 | 83.09 | 1.642 | 83.85 | 1.657 | 85.62 | 1.692 |
| 4 | Al$_2$O$_3$ | 1.64 | 38.16 | 0.501 | 37.85 | 0.497 | 37.24 | 0.489 |
| 5 | SiO$_2$ | 1.48 | 84.28 | 0.998 | 83.61 | 0.990 | 82.26 | 0.974 |
| 6 | Al$_2$O$_3$ | 1.64 | 38.16 | 0.501 | 37.85 | 0.497 | 37.24 | 0.489 |
| 7 | TiO$_2$ | 2.47 | 83.09 | 1.642 | 83.85 | 1.657 | 85.62 | 1.692 |
| 8 | Al$_2$O$_3$ | 1.64 | 38.16 | 0.501 | 37.85 | 0.497 | 37.24 | 0.489 |
| 9 | SiO$_2$ | 1.48 | 84.28 | 0.998 | 83.61 | 0.990 | 82.26 | 0.974 |
| 10 | Al$_2$O$_3$ | 1.64 | 38.16 | 0.501 | 37.85 | 0.497 | 37.24 | 0.489 |
| 11 | TiO$_2$ | 2.47 | 83.09 | 1.642 | 83.85 | 1.657 | 85.62 | 1.692 |
| 12 | Al$_2$O$_3$ | 1.64 | 38.16 | 0.501 | 37.85 | 0.497 | 37.24 | 0.489 |
| 13 | SiO$_2$ | 1.48 | 84.28 | 0.998 | 83.61 | 0.990 | 82.26 | 0.974 |
| 14 | Al$_2$O$_3$ | 1.64 | 38.16 | 0.501 | 37.85 | 0.497 | 37.24 | 0.489 |
| 15 | TiO$_2$ | 2.47 | 83.09 | 1.642 | 83.85 | 1.657 | 85.62 | 1.692 |
| 16 | Al$_2$O$_3$ | 1.64 | 38.16 | 0.501 | 37.85 | 0.497 | 37.24 | 0.489 |
| 17 | SiO$_2$ | 1.48 | 84.28 | 0.998 | 83.61 | 0.990 | 82.26 | 0.974 |
| 18 | Al$_2$O$_3$ | 1.64 | 38.16 | 0.501 | 37.85 | 0.497 | 37.24 | 0.489 |
| 19 | TiO$_2$ | 2.47 | 83.09 | 1.642 | 83.85 | 1.657 | 85.62 | 1.692 |
| 20 | Al$_2$O$_3$ | 1.64 | 38.16 | 0.501 | 37.85 | 0.497 | 37.24 | 0.489 |
| 21 | SiO$_2$ | 1.48 | 84.28 | 0.998 | 83.61 | 0.990 | 82.26 | 0.974 |
| 22 | Al$_2$O$_3$ | 1.64 | 38.16 | 0.501 | 37.85 | 0.497 | 37.24 | 0.489 |
| 23 | TiO$_2$ | 2.47 | 83.09 | 1.642 | 83.85 | 1.657 | 85.62 | 1.692 |
| 24 | Al$_2$O$_3$ | 1.64 | 38.16 | 0.501 | 37.85 | 0.497 | 37.24 | 0.489 |
| 25 | SiO$_2$ | 1.48 | 84.28 | 0.998 | 83.61 | 0.990 | 82.26 | 0.974 |
| 26 | Al$_2$O$_3$ | 1.64 | 38.16 | 0.501 | 37.85 | 0.497 | 37.24 | 0.489 |
| 27 | TiO$_2$ | 2.47 | 83.09 | 1.642 | 83.85 | 1.657 | 85.62 | 1.692 |
| 28 | Al$_2$O$_3$ | 1.64 | 38.16 | 0.501 | 37.85 | 0.497 | 37.24 | 0.489 |
| 29 | SiO$_2$ | 1.48 | 84.28 | 0.998 | 83.61 | 0.990 | 82.26 | 0.974 |
| 30 | Al$_2$O$_3$ | 1.64 | 38.16 | 0.501 | 37.85 | 0.497 | 37.24 | 0.489 |
| 31 | TiO$_2$ | 2.47 | 83.09 | 1.642 | 83.85 | 1.657 | 85.62 | 1.692 |
| 32 | Al$_2$O$_3$ | 1.64 | 38.16 | 0.501 | 37.85 | 0.497 | 37.24 | 0.489 |
| 33 | SiO$_2$ | 1.48 | 84.28 | 0.998 | 83.61 | 0.990 | 82.26 | 0.974 |
| 34 | Al$_2$O$_3$ | 1.64 | 38.16 | 0.501 | 37.85 | 0.497 | 37.24 | 0.489 |
| 35 | TiO$_2$ | 2.47 | 83.09 | 1.642 | 83.85 | 1.657 | 85.62 | 1.692 |
| 36 | Al$_2$O$_3$ | 1.64 | 38.16 | 0.501 | 37.85 | 0.497 | 37.24 | 0.489 |
| 37 | SiO$_2$ | 1.48 | 42.14 | 0.499 | 41.8 | 0.495 | 41.13 | 0.487 |

Figure 9:
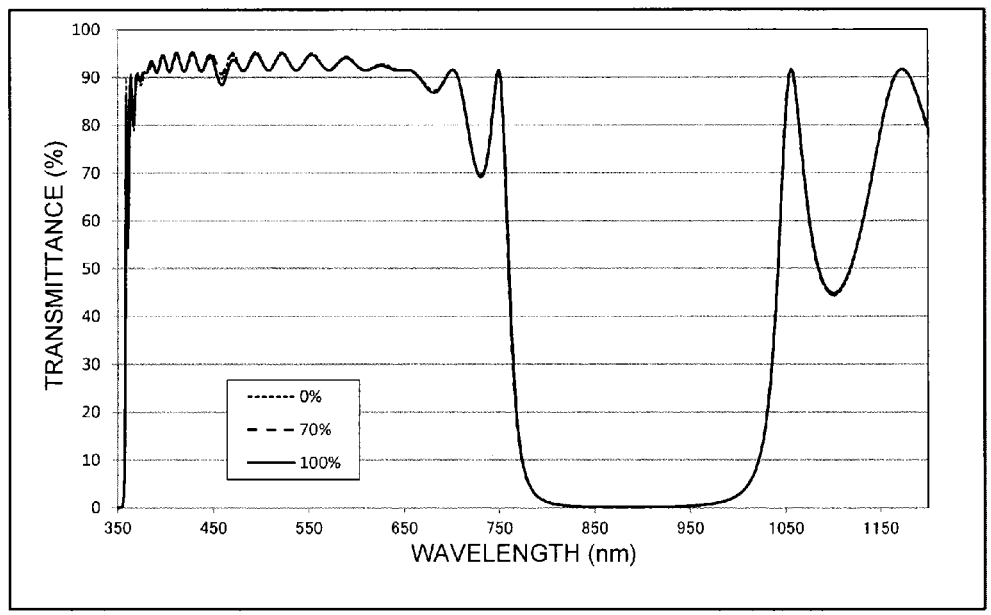
FIG. 9 is a graph illustrating simulation results of spectral characteristics under the incident condition of 0° of an optical multilayer listed in Table 3.
Figure 10:
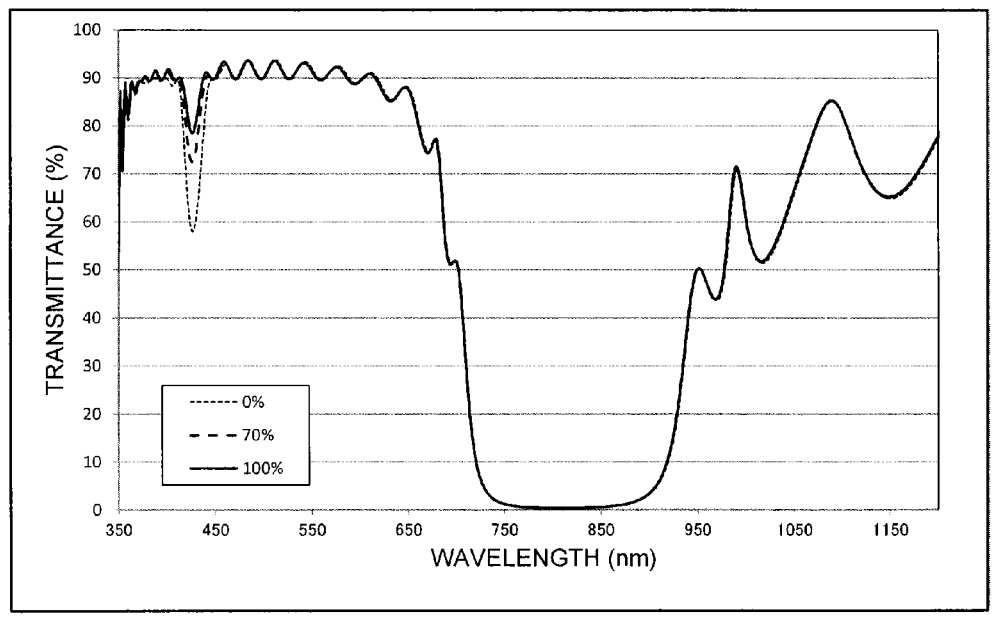
FIG. 10 is a graph illustrating simulation results of spectral characteristics under the incident condition of 45° of the optical multilayer listed in Table 3.

FIG. 9 is a graph illustrating the simulation results of spectral characteristics under the incident condition of 0° of the optical multilayer listed in Table 3. Further, FIG. 10 is a graph illustrating the simulation results of spectral characteristics under the incident condition of 45° of the optical multilayer listed in Table 3. From the above, it is found that in the case where the maximum value and the minimum value of $(2T_L+2T_M)/T_H$ in which there is no part where the transmittance locally decreases by 5% or more in the wavelength range of 400 nm to 700 nm in spectral characteristics under the incident condition of 0° are set to 100% and 0% respectively, when $(2T_L+2T_M)/T_H$ falls within the range of 100% to 70%, the optical multilayer can suppress the ripple in the transmission band in the wavelength range of 400 nm to 700 nm even under the incident condition of 45° and its local decrease in transmittance is as low as 18.8%. Further, it is found that when $(2T_L+2T_M)/T_H$ is 0%, the local decrease in the transmission band in spectral characteristics under the incident condition of 45° is 38.4% and the ripple cannot be sufficiently suppressed.

Example 4

The optical multilayer has the same repeated layered structure as that in Example 1 and is different only in that the optical multilayer has a stopband of a region where the mean transmittance is 10% or lower in a wavelength range of 960 nm to 1260 nm on the near-infrared side of the transmission band. For the optical multilayer, layer configurations at 100% (maximum value), 0% (minimum value), 70% of $(2T_L+2T_M)/T_H$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $(2T_L+2T_M)/T_H$ in which there is no part where the transmittance of the optical multilayer locally decreases by 5% or more are listed in the following Table 4. 100% (maximum value) of $(2T_L+2T_M)/T_H$ was 1.187, 0% (minimum value) thereof was 1.120, and 70% thereof was 1.167.

TABLE 4

| Layer number | Layer material | @Wavelength 500 nm Refractive index | 100% Layer thickness [nm] | QWOT | 70% Layer thickness [nm] | QWOT | 0% Layer thickness [nm] | QWOT |
|---|---|---|---|---|---|---|---|---|
| 1 | SiO$_2$ | 1.48 | 52.08 | 0.617 | 51.66 | 0.612 | 50.57 | 0.599 |
| 2 | Al$_2$O$_3$ | 1.64 | 47.16 | 0.619 | 46.78 | 0.614 | 45.79 | 0.601 |
| 3 | TiO$_2$ | 2.47 | 105.38 | 2.082 | 106.29 | 2.100 | 108.42 | 2.142 |
| 4 | Al$_2$O$_3$ | 1.64 | 47.16 | 0.619 | 46.78 | 0.614 | 45.79 | 0.601 |
| 5 | SiO$_2$ | 1.48 | 104.17 | 1.233 | 103.33 | 1.223 | 101.14 | 1.197 |
| 6 | Al$_2$O$_3$ | 1.64 | 47.16 | 0.619 | 46.78 | 0.614 | 45.79 | 0.601 |
| 7 | TiO$_2$ | 2.47 | 105.38 | 2.082 | 106.29 | 2.100 | 108.42 | 2.142 |
| 8 | Al$_2$O$_3$ | 1.64 | 47.16 | 0.619 | 46.78 | 0.614 | 45.79 | 0.601 |
| 9 | SiO$_2$ | 1.48 | 104.17 | 1.233 | 103.33 | 1.223 | 101.14 | 1.197 |
| 10 | Al$_2$O$_3$ | 1.64 | 47.16 | 0.619 | 46.78 | 0.614 | 45.79 | 0.601 |
| 11 | TiO$_2$ | 2.47 | 105.38 | 2.082 | 106.29 | 2.100 | 108.42 | 2.142 |
| 12 | Al$_2$O$_3$ | 1.64 | 47.16 | 0.619 | 46.78 | 0.614 | 45.79 | 0.601 |
| 13 | SiO$_2$ | 1.48 | 104.17 | 1.233 | 103.33 | 1.223 | 101.14 | 1.197 |
| 14 | Al$_2$O$_3$ | 1.64 | 47.16 | 0.619 | 46.78 | 0.614 | 45.79 | 0.601 |
| 15 | TiO$_2$ | 2.47 | 105.38 | 2.082 | 106.29 | 2.100 | 108.42 | 2.142 |
| 16 | Al$_2$O$_3$ | 1.64 | 47.16 | 0.619 | 46.78 | 0.614 | 45.79 | 0.601 |
| 17 | SiO$_2$ | 1.48 | 104.17 | 1.233 | 103.33 | 1.223 | 101.14 | 1.197 |
| 18 | Al$_2$O$_3$ | 1.64 | 47.16 | 0.619 | 46.78 | 0.614 | 45.79 | 0.601 |
| 19 | TiO$_2$ | 2.47 | 105.38 | 2.082 | 106.29 | 2.100 | 108.42 | 2.142 |
| 20 | Al$_2$O$_3$ | 1.64 | 47.16 | 0.619 | 46.78 | 0.614 | 45.79 | 0.601 |
| 21 | SiO$_2$ | 1.48 | 104.17 | 1.233 | 103.33 | 1.223 | 101.14 | 1.197 |
| 22 | Al$_2$O$_3$ | 1.64 | 47.16 | 0.619 | 46.78 | 0.614 | 45.79 | 0.601 |
| 23 | TiO$_2$ | 2.47 | 105.38 | 2.082 | 106.29 | 2.100 | 108.42 | 2.142 |
| 24 | Al$_2$O$_3$ | 1.64 | 47.16 | 0.619 | 46.78 | 0.614 | 45.79 | 0.601 |
| 25 | SiO$_2$ | 1.48 | 104.17 | 1.233 | 103.33 | 1.223 | 101.14 | 1.197 |
| 26 | Al$_2$O$_3$ | 1.64 | 47.16 | 0.619 | 46.78 | 0.614 | 45.79 | 0.601 |
| 27 | TiO$_2$ | 2.47 | 105.38 | 2.082 | 106.29 | 2.100 | 108.42 | 2.142 |
| 28 | Al$_2$O$_3$ | 1.64 | 47.16 | 0.619 | 46.78 | 0.614 | 45.79 | 0.601 |
| 29 | SiO$_2$ | 1.48 | 104.17 | 1.233 | 103.33 | 1.223 | 101.14 | 1.197 |
| 30 | Al$_2$O$_3$ | 1.64 | 47.16 | 0.619 | 46.78 | 0.614 | 45.79 | 0.601 |
| 31 | TiO$_2$ | 2.47 | 105.38 | 2.082 | 106.29 | 2.100 | 108.42 | 2.142 |
| 32 | Al$_2$O$_3$ | 1.64 | 47.16 | 0.619 | 46.78 | 0.614 | 45.79 | 0.601 |
| 33 | SiO$_2$ | 1.48 | 104.17 | 1.233 | 103.33 | 1.223 | 101.14 | 1.197 |
| 34 | Al$_2$O$_3$ | 1.64 | 47.16 | 0.619 | 46.78 | 0.614 | 45.79 | 0.601 |
| 35 | TiO$_2$ | 2.47 | 105.38 | 2.082 | 106.29 | 2.100 | 108.42 | 2.142 |
| 36 | Al$_2$O$_3$ | 1.64 | 47.16 | 0.619 | 46.78 | 0.614 | 45.79 | 0.601 |
| 37 | SiO$_2$ | 1.48 | 52.08 | 0.617 | 51.66 | 0.612 | 50.57 | 0.599 |

Figure 11:
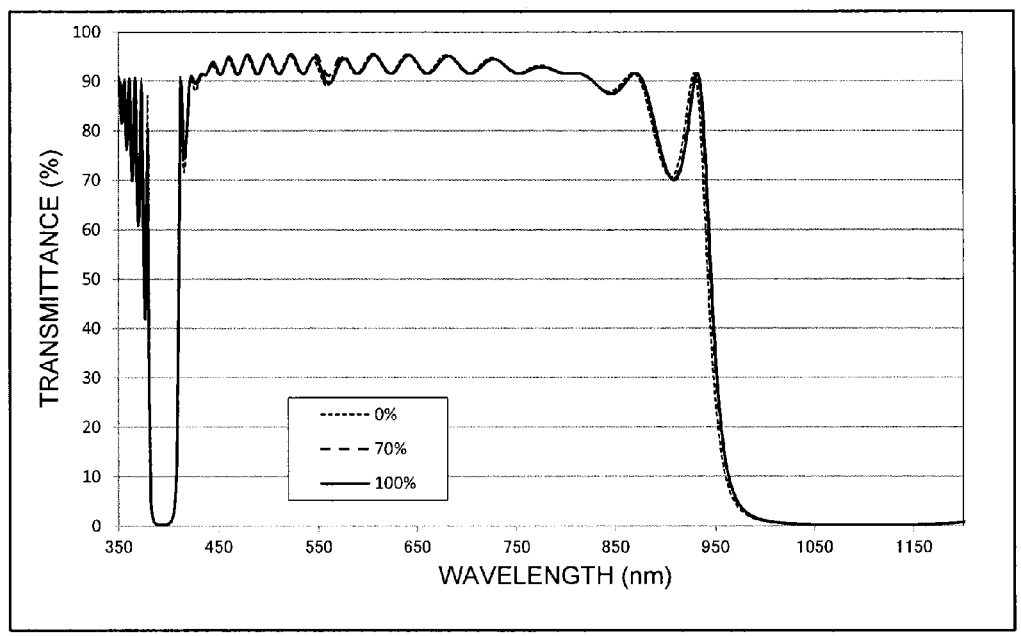
FIG. 11 is a graph illustrating simulation results of spectral characteristics under the incident condition of 0° of an optical multilayer listed in Table 4.
Figure 12:
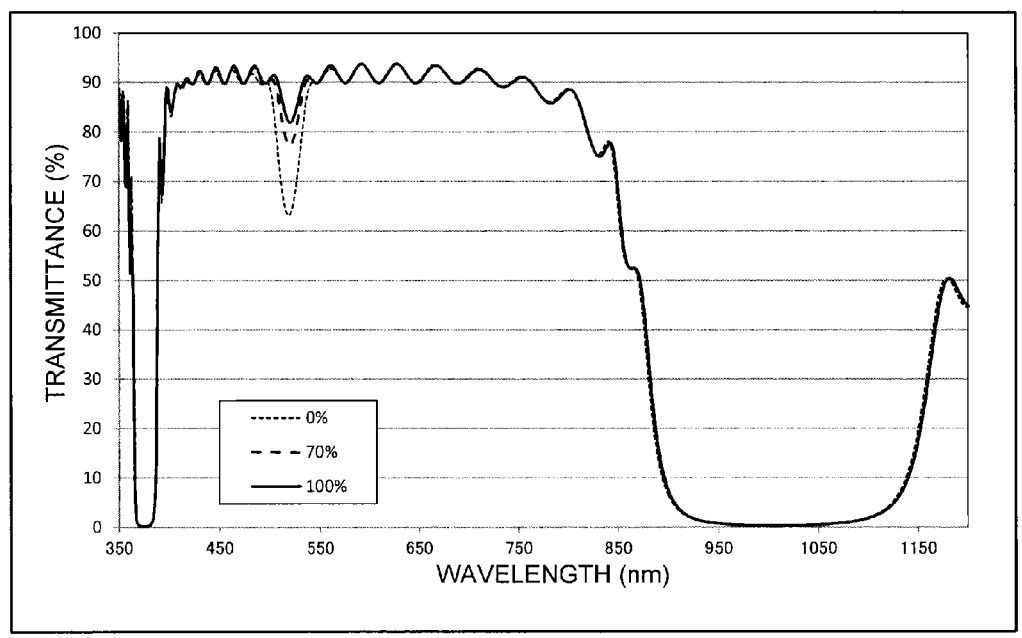
FIG. 12 is a graph illustrating simulation results of spectral characteristics under the incident condition of 45° of the optical multilayer listed in Table 4.

FIG. 11 is a graph illustrating the simulation results of spectral characteristics under the incident condition of 0° of the optical multilayer listed in Table 4. Further, FIG. 12 is a graph illustrating the simulation results of spectral characteristics under the incident condition of 45° of the optical multilayer listed in Table 4. From the above, it is found that in the case where the maximum value and the minimum value of $(2T_L+2T_M)/T_H$ in which there is no part where the transmittance locally decreases by 5% or more in the wavelength range of 400 nm to 700 nm in spectral characteristics under the incident condition of 0° are set to 100% and 0% respectively, when $(2T_L+2T_M)/T_H$ falls within the range of 100% to 70%, the optical multilayer can suppress the ripple in the transmission band in the wavelength range of 400 nm to 700 nm even under the incident condition of 45° and its local decrease in transmittance is as low as 13.5%. Further, it is found that when $(2T_L+2T_M)/T_H$ is 0%, the local decrease in the transmission band in spectral characteristics under the incident condition of 45° is 29.7% and the ripple cannot be sufficiently suppressed.

Example 5

The optical multilayer is a repeated stack of nine layers of (LMHML) composed of niobium oxide (high-refractive index layer), aluminum oxide (middle-refractive index layer) and silicon oxide (low-refractive index layer). Further, the optical multilayer include the transmission band where the mean transmittance is 85% or higher in the wavelength range of 400 nm to 700 nm, and the stopband of the region where the mean transmittance is 10% or lower in a wavelength range of 774 nm to 1010 nm on the near-infrared side of the transmission band. For the optical multilayer, layer configurations at 100% (maximum value), 0% (minimum value), 70% of $(2T_L+2T_M)/T_H$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $(2T_L+2T_M)/T_H$ in which there is no part where the transmittance of the optical multilayer locally decreases by 5% or more are listed in the following Table 5. 100% (maximum value) of $(2T_L+2T_M)/T_H$ was 1.234, 0% (minimum value) thereof was 1.165, and 70% thereof was 1.212.

TABLE 5

| Layer number | Layer material | @Wavelength 500 nm Refractive index | 100% Layer thickness [nm] | QWOT | 70% Layer thickness [nm] | QWOT | 0% Layer thickness [nm] | QWOT |
|---|---|---|---|---|---|---|---|---|
| 1 | $SiO_2$ | 1.48 | 41.89 | 0.496 | 41.55 | 0.492 | 40.79 | 0.483 |
| 2 | $Al_2O_3$ | 1.64 | 37.93 | 0.498 | 37.62 | 0.494 | 36.94 | 0.485 |
| 3 | $Nb_2O_5$ | 2.38 | 84.59 | 1.611 | 85.38 | 1.626 | 87.22 | 1.661 |
| 4 | $Al_2O_3$ | 1.64 | 37.93 | 0.498 | 37.62 | 0.494 | 36.94 | 0.485 |
| 5 | $SiO_2$ | 1.48 | 83.77 | 0.992 | 83.1 | 0.984 | 81.58 | 0.966 |
| 6 | $Al_2O_3$ | 1.64 | 37.93 | 0.498 | 37.62 | 0.494 | 36.94 | 0.485 |
| 7 | $Nb_2O_5$ | 2.38 | 84.59 | 1.611 | 85.38 | 1.626 | 87.22 | 1.661 |
| 8 | $Al_2O_3$ | 1.64 | 37.93 | 0.498 | 37.62 | 0.494 | 36.94 | 0.485 |
| 9 | $SiO_2$ | 1.48 | 83.77 | 0.992 | 83.1 | 0.984 | 81.58 | 0.966 |
| 10 | $Al_2O_3$ | 1.64 | 37.93 | 0.498 | 37.62 | 0.494 | 36.94 | 0.485 |
| 11 | $Nb_2O_5$ | 2.38 | 84.59 | 1.611 | 85.38 | 1.626 | 87.22 | 1.661 |
| 12 | $Al_2O_3$ | 1.64 | 37.93 | 0.498 | 37.62 | 0.494 | 36.94 | 0.485 |
| 13 | $SiO_2$ | 1.48 | 83.77 | 0.992 | 83.1 | 0.984 | 81.58 | 0.966 |
| 14 | $Al_2O_3$ | 1.64 | 37.93 | 0.498 | 37.62 | 0.494 | 36.94 | 0.485 |
| 15 | $Nb_2O_5$ | 2.38 | 84.59 | 1.611 | 85.38 | 1.626 | 87.22 | 1.661 |
| 16 | $Al_2O_3$ | 1.64 | 37.93 | 0.498 | 37.62 | 0.494 | 36.94 | 0.485 |
| 17 | $SiO_2$ | 1.48 | 83.77 | 0.992 | 83.1 | 0.984 | 81.58 | 0.966 |
| 18 | $Al_2O_3$ | 1.64 | 37.93 | 0.498 | 37.62 | 0.494 | 36.94 | 0.485 |
| 19 | $Nb_2O_5$ | 2.38 | 84.59 | 1.611 | 85.38 | 1.626 | 87.22 | 1.661 |
| 20 | $Al_2O_3$ | 1.64 | 37.93 | 0.498 | 37.62 | 0.494 | 36.94 | 0.485 |
| 21 | $SiO_2$ | 1.48 | 83.77 | 0.992 | 83.1 | 0.984 | 81.58 | 0.966 |
| 22 | $Al_2O_3$ | 1.64 | 37.93 | 0.498 | 37.62 | 0.494 | 36.94 | 0.485 |
| 23 | $Nb_2O_5$ | 2.38 | 84.59 | 1.611 | 85.38 | 1.626 | 87.22 | 1.661 |
| 24 | $Al_2O_3$ | 1.64 | 37.93 | 0.498 | 37.62 | 0.494 | 36.94 | 0.485 |
| 25 | $SiO_2$ | 1.48 | 83.77 | 0.992 | 83.1 | 0.984 | 81.58 | 0.966 |
| 26 | $Al_2O_3$ | 1.64 | 37.93 | 0.498 | 37.62 | 0.494 | 36.94 | 0.485 |
| 27 | $Nb_2O_5$ | 2.38 | 84.59 | 1.611 | 85.38 | 1.626 | 87.22 | 1.661 |
| 28 | $Al_2O_3$ | 1.64 | 37.93 | 0.498 | 37.62 | 0.494 | 36.94 | 0.485 |
| 29 | $SiO_2$ | 1.48 | 83.77 | 0.992 | 83.1 | 0.984 | 81.58 | 0.966 |
| 30 | $Al_2O_3$ | 1.64 | 37.93 | 0.498 | 37.62 | 0.494 | 36.94 | 0.485 |
| 31 | $Nb_2O_5$ | 2.38 | 84.59 | 1.611 | 85.38 | 1.626 | 87.22 | 1.661 |
| 32 | $Al_2O_3$ | 1.64 | 37.93 | 0.498 | 37.62 | 0.494 | 36.94 | 0.485 |
| 33 | $SiO_2$ | 1.48 | 83.77 | 0.992 | 83.1 | 0.984 | 81.58 | 0.966 |
| 34 | $Al_2O_3$ | 1.64 | 37.93 | 0.498 | 37.62 | 0.494 | 36.94 | 0.485 |
| 35 | $Nb_2O_5$ | 2.38 | 84.59 | 1.611 | 85.38 | 1.626 | 87.22 | 1.661 |
| 36 | $Al_2O_3$ | 1.64 | 37.93 | 0.498 | 37.62 | 0.494 | 36.94 | 0.485 |
| 37 | $SiO_2$ | 1.48 | 41.89 | 0.496 | 41.55 | 0.492 | 40.79 | 0.483 |

Figure 13:
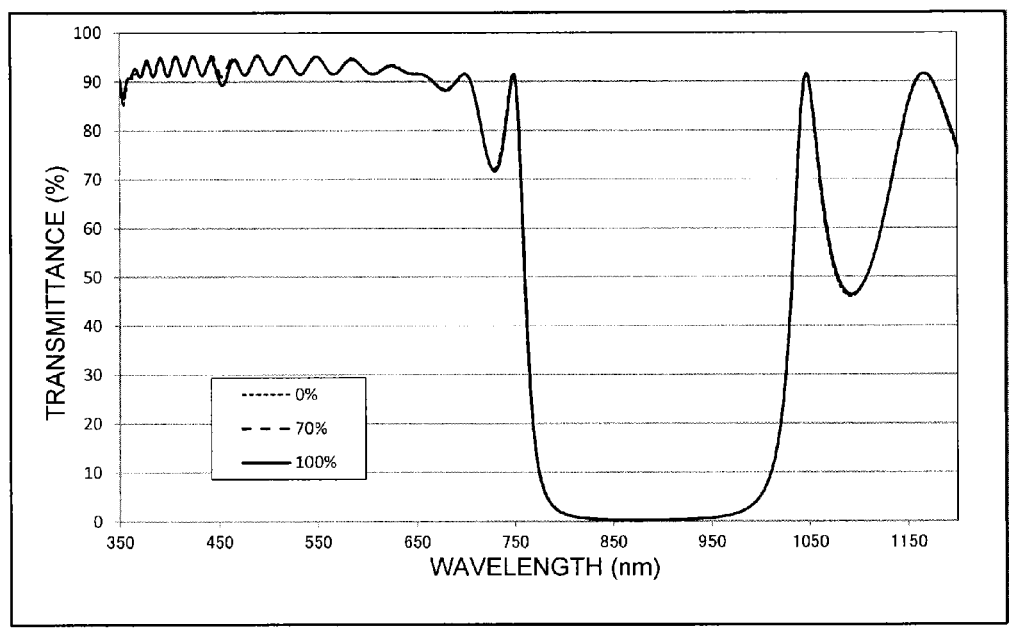
FIG. 13 is a graph illustrating simulation results of spectral characteristics under the incident condition of 0° of an optical multilayer listed in Table 5.
Figure 14:
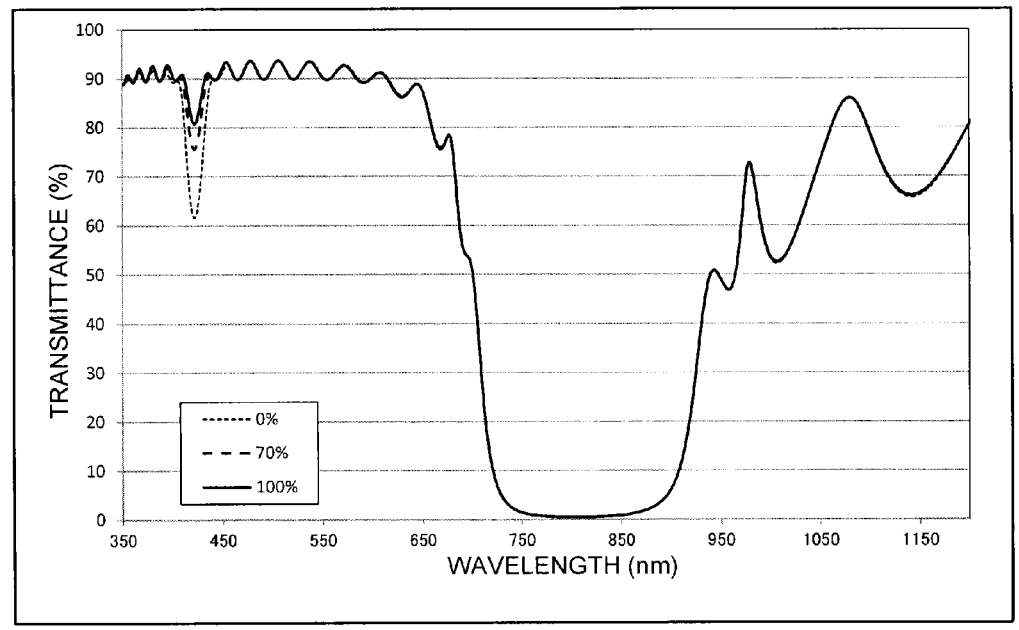
FIG. 14 is a graph illustrating simulation results of spectral characteristics under the incident condition of 45° of the optical multilayer listed in Table 5.

FIG. 13 is a graph illustrating the simulation results of spectral characteristics under the incident condition of 0° of the optical multilayer listed in Table 5. Further, FIG. 14 is a graph illustrating the simulation results of spectral characteristics under the incident condition of 45° of the optical multilayer listed in Table 5. From the above, it is found that in the case where the maximum value and the minimum value of $(2T_L+2T_M)/T_H$ in which there is no part where the transmittance locally decreases by 5% or more in the wavelength range of 400 nm to 700 nm in spectral characteristics under the incident condition of 0° are set to 100% and 0% respectively, when $(2T_L+2T_M)/T_H$ falls within the range of 100% to 70%, the optical multilayer can suppress the ripple in the transmission band in the wavelength range of 400 nm to 700 nm even under the incident condition of 45° and its local decrease in transmittance is as low as 14.9%. Further, it is found that when $(2T_L+2T_M)/T_H$ is 0%, the local decrease in the transmission band in spectral characteristics under the incident condition of 45° is 31.4% and the ripple cannot be sufficiently suppressed.

Example 6

The optical multilayer has the same repeated layered structure as that in Example 1 and is different only in that the optical multilayer has a stopband of a region where the mean transmittance is 10% or lower in a wavelength range of 983 nm to 1284 nm on the near-infrared side of the transmission band. For the optical multilayer, layer configurations at 100% (maximum value), 0% (minimum value), 70% of $(2T_L+2T_M)/T_H$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $(2T_L+2T_M)/T_H$ in which there is no part where the transmittance of the optical multilayer locally decreases by 5% or more are listed in the following Table 6. 100% (maximum value) of $(2T_L+2T_M)/T_H$ was 1.216, 0% (minimum value) thereof was 1.132, and 70% thereof was 1.191.

TABLE 6

| Layer number | Layer material | 500 nm Refractive index | 100% Layer thickness [nm] | QWOT | 70% Layer thickness [nm] | QWOT | 0% Layer thickness [nm] | QWOT |
|---|---|---|---|---|---|---|---|---|
| 1 | SiO$_2$ | 1.48 | 53.1 | 0.629 | 52.59 | 0.623 | 51.33 | 0.608 |
| 2 | Al$_2$O$_3$ | 1.64 | 48.08 | 0.631 | 47.62 | 0.625 | 46.48 | 0.610 |
| 3 | Nb$_2$O$_5$ | 2.38 | 108.76 | 2.071 | 110.02 | 2.095 | 112.96 | 2.151 |
| 4 | Al$_2$O$_3$ | 1.64 | 48.08 | 0.631 | 47.62 | 0.625 | 46.48 | 0.610 |
| 5 | SiO$_2$ | 1.48 | 106.19 | 1.257 | 105.18 | 1.245 | 102.65 | 1.215 |
| 6 | Al$_2$O$_3$ | 1.64 | 48.08 | 0.631 | 47.62 | 0.625 | 46.48 | 0.610 |
| 7 | Nb$_2$O$_5$ | 2.38 | 108.76 | 2.071 | 110.02 | 2.095 | 112.96 | 2.151 |
| 8 | Al$_2$O$_3$ | 1.64 | 48.08 | 0.631 | 47.62 | 0.625 | 46.48 | 0.610 |
| 9 | SiO$_2$ | 1.48 | 106.19 | 1.257 | 105.18 | 1.245 | 102.65 | 1.215 |
| 10 | Al$_2$O$_3$ | 1.64 | 48.08 | 0.631 | 47.62 | 0.625 | 46.48 | 0.610 |
| 11 | Nb$_2$O$_5$ | 2.38 | 108.76 | 2.071 | 110.02 | 2.095 | 112.96 | 2.151 |
| 12 | Al$_2$O$_3$ | 1.64 | 48.08 | 0.631 | 47.62 | 0.625 | 46.48 | 0.610 |
| 13 | SiO$_2$ | 1.48 | 106.19 | 1.257 | 105.18 | 1.245 | 102.65 | 1.215 |
| 14 | Al$_2$O$_3$ | 1.64 | 48.08 | 0.631 | 47.62 | 0.625 | 46.48 | 0.610 |
| 15 | Nb$_2$O$_5$ | 2.38 | 108.76 | 2.071 | 110.02 | 2.095 | 112.96 | 2.151 |
| 16 | Al$_2$O$_3$ | 1.64 | 48.08 | 0.631 | 47.62 | 0.625 | 46.48 | 0.610 |
| 17 | SiO$_2$ | 1.48 | 106.19 | 1.257 | 105.18 | 1.245 | 102.65 | 1.215 |
| 18 | Al$_2$O$_3$ | 1.64 | 48.08 | 0.631 | 47.62 | 0.625 | 46.48 | 0.610 |
| 19 | Nb$_2$O$_5$ | 2.38 | 108.76 | 2.071 | 110.02 | 2.095 | 112.96 | 2.151 |
| 20 | Al$_2$O$_3$ | 1.64 | 48.08 | 0.631 | 47.62 | 0.625 | 46.48 | 0.610 |
| 21 | SiO$_2$ | 1.48 | 106.19 | 1.257 | 105.18 | 1.245 | 102.65 | 1.215 |
| 22 | Al$_2$O$_3$ | 1.64 | 48.08 | 0.631 | 47.62 | 0.625 | 46.48 | 0.610 |
| 23 | Nb$_2$O$_5$ | 2.38 | 108.76 | 2.071 | 110.02 | 2.095 | 112.96 | 2.151 |
| 24 | Al$_2$O$_3$ | 1.64 | 48.08 | 0.631 | 47.62 | 0.625 | 46.48 | 0.610 |
| 25 | SiO$_2$ | 1.48 | 106.19 | 1.257 | 105.18 | 1.245 | 102.65 | 1.215 |
| 26 | Al$_2$O$_3$ | 1.64 | 48.08 | 0.631 | 47.62 | 0.625 | 46.48 | 0.610 |
| 27 | Nb$_2$O$_5$ | 2.38 | 108.76 | 2.071 | 110.02 | 2.095 | 112.96 | 2.151 |
| 28 | Al$_2$O$_3$ | 1.64 | 48.08 | 0.631 | 47.62 | 0.625 | 46.48 | 0.610 |
| 29 | SiO$_2$ | 1.48 | 106.19 | 1.257 | 105.18 | 1.245 | 102.65 | 1.215 |
| 30 | Al$_2$O$_3$ | 1.64 | 48.08 | 0.631 | 47.62 | 0.625 | 46.48 | 0.610 |
| 31 | Nb$_2$O$_5$ | 2.38 | 108.76 | 2.071 | 110.02 | 2.095 | 112.96 | 2.151 |
| 32 | Al$_2$O$_3$ | 1.64 | 48.08 | 0.631 | 47.62 | 0.625 | 46.48 | 0.610 |
| 33 | SiO$_2$ | 1.48 | 106.19 | 1.257 | 105.18 | 1.245 | 102.65 | 1.215 |
| 34 | Al$_2$O$_3$ | 1.64 | 48.08 | 0.631 | 47.62 | 0.625 | 46.48 | 0.610 |
| 35 | Nb$_2$O$_5$ | 2.38 | 108.76 | 2.071 | 110.02 | 2.095 | 112.96 | 2.151 |
| 36 | Al$_2$O$_3$ | 1.64 | 48.08 | 0.631 | 47.62 | 0.625 | 46.48 | 0.610 |
| 37 | SiO$_2$ | 1.48 | 53.1 | 0.629 | 52.59 | 0.623 | 51.33 | 0.608 |

Figure 15:
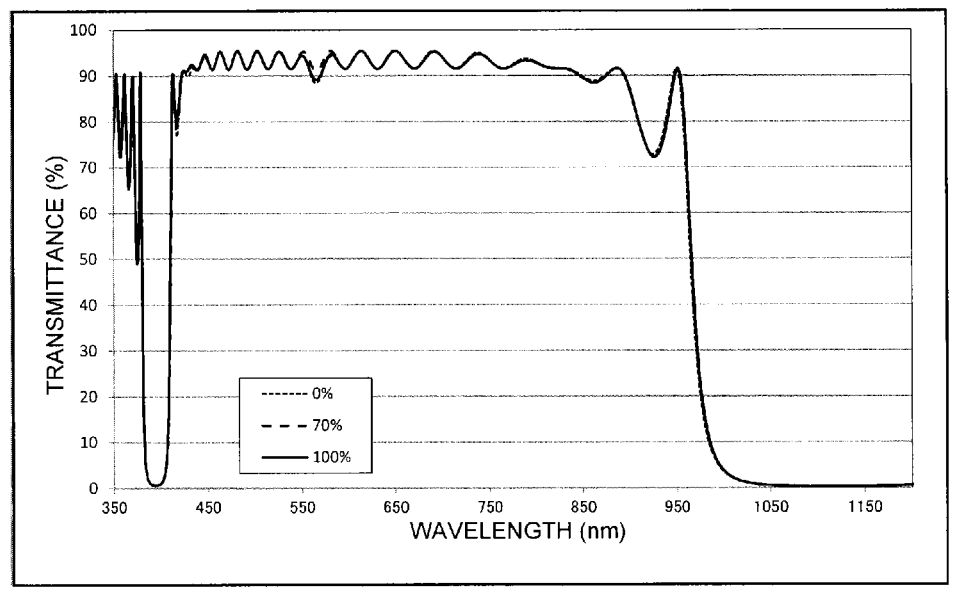
FIG. 15 is a graph illustrating simulation results of spectral characteristics under the incident condition of 0° of an optical multilayer listed in Table 6.
Figure 16:
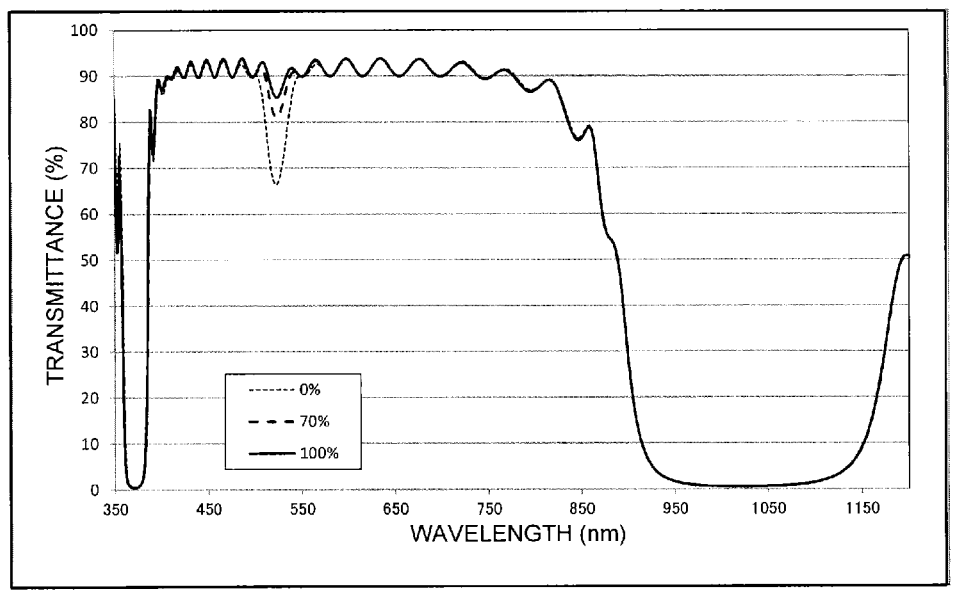
FIG. 16 is a graph illustrating simulation results of spectral characteristics under the incident condition of 45° of the optical multilayer listed in Table 6.

FIG. 15 is a graph illustrating the simulation results of spectral characteristics under the incident condition of 0° of the optical multilayer listed in Table 6. Further, FIG. 16 is a graph illustrating the simulation results of spectral characteristics under the incident condition of 45° of the optical multilayer listed in Table 6. From the above, it is found that in the case where the maximum value and the minimum value of $(2T_L+2T_M)/T_H$ in which there is no part where the transmittance locally decreases by 5% or more in the wavelength range of 400 nm to 700 nm in spectral characteristics under the incident condition of 0° are set to 100% and 0% respectively, when $(2T_L+2T_M)/T_H$ falls within the range of 100% to 70%, the optical multilayer can suppress the ripple in the transmission band in the wavelength range of 400 nm to 700 nm even under the incident condition of 45° and its local decrease in transmittance is as low as 10.7%. Further, it is found that when $(2T_L+2T_M)/T_H$ is 0%, the local decrease in the transmission band in spectral characteristics under the incident condition of 45° is 26.2% and the ripple cannot be sufficiently suppressed.

Comparative Example

Subsequently, the following optical multilayer was investigated as Comparative Example. The optical multilayer is a repeated stack of ten layers of (HL) composed of titanium oxide (high-refractive index layer) and silicon oxide (low-refractive index layer). Further, the optical multilayer includes the transmission band where the mean transmittance is 85% or higher in the wavelength range of 400 nm to 700 nm, and the stopband of the region where the mean transmittance is 10% or lower in a wavelength range of 900 nm to 1200 nm. For the optical multilayer, layer configurations at 100% (maximum value), 0% (minimum value), 70% of $T_L/T_H$ in which there is no part where the transmittance locally decreases by 5% or more in the wavelength range of 400 nm to 700 nm in spectral characteristics under the incident condition of 0° were investigated by simulations. The layer configurations at 100% (maximum value), 0% (minimum value), 70% of $T_L/T_H$ in which there is no part where the transmittance of the optical multilayer locally decreases by 5% or more are listed in the following Table 7. 100% (maximum value) of $T_L/T_H$ was 0.997, 0% (minimum value) thereof was 0.960, and 70% thereof was 0.986. The layer configurations of the optical multilayer are listed in the following Table 7.

TABLE 7

| Layer number | Layer material | @Wavelength 500 nm Refractive index | 100% Layer thickness [nm] | QWOT | 70% Layer thickness [nm] | QWOT | 0% Layer thickness [nm] | QWOT |
|---|---|---|---|---|---|---|---|---|
| 1 | $TiO_2$ | 2.47 | 115.82 | 2.289 | 116.48 | 2.302 | 118.05 | 2.333 |
| 2 | $SiO_2$ | 1.48 | 192.66 | 2.281 | 191.65 | 2.269 | 189.21 | 2.240 |
| 3 | $TiO_2$ | 2.47 | 115.82 | 2.289 | 116.48 | 2.302 | 118.05 | 2.333 |
| 4 | $SiO_2$ | 1.48 | 192.66 | 2.281 | 191.65 | 2.269 | 189.21 | 2.240 |
| 5 | $TiO_2$ | 2.47 | 115.82 | 2.289 | 116.48 | 2.302 | 118.05 | 2.333 |
| 6 | $SiO_2$ | 1.48 | 192.66 | 2.281 | 191.65 | 2.269 | 189.21 | 2.240 |
| 7 | $TiO_2$ | 2.47 | 115.82 | 2.289 | 116.48 | 2.302 | 118.05 | 2.333 |
| 8 | $SiO_2$ | 1.48 | 192.66 | 2.281 | 191.65 | 2.269 | 189.21 | 2.240 |
| 9 | $TiO_2$ | 2.47 | 115.82 | 2.289 | 116.48 | 2.302 | 118.05 | 2.333 |
| 10 | $SiO_2$ | 1.48 | 192.66 | 2.281 | 191.65 | 2.269 | 189.21 | 2.240 |
| 11 | $TiO_2$ | 2.47 | 115.82 | 2.289 | 116.48 | 2.302 | 118.05 | 2.333 |
| 12 | $SiO_2$ | 1.48 | 192.66 | 2.281 | 191.65 | 2.269 | 189.21 | 2.240 |
| 13 | $TiO_2$ | 2.47 | 115.82 | 2.289 | 116.48 | 2.302 | 118.05 | 2.333 |
| 14 | $SiO_2$ | 1.48 | 192.66 | 2.281 | 191.65 | 2.269 | 189.21 | 2.240 |
| 15 | $TiO_2$ | 2.47 | 115.82 | 2.289 | 116.48 | 2.302 | 118.05 | 2.333 |
| 16 | $SiO_2$ | 1.48 | 192.66 | 2.281 | 191.65 | 2.269 | 189.21 | 2.240 |
| 17 | $TiO_2$ | 2.47 | 115.82 | 2.289 | 116.48 | 2.302 | 118.05 | 2.333 |
| 18 | $SiO_2$ | 1.48 | 192.66 | 2.281 | 191.65 | 2.269 | 189.21 | 2.240 |
| 19 | $TiO_2$ | 2.47 | 115.82 | 2.289 | 116.48 | 2.302 | 118.05 | 2.333 |
| 20 | $SiO_2$ | 1.48 | 96.33 | 1.141 | 95.83 | 1.135 | 94.6 | 1.120 |

Figure 17:
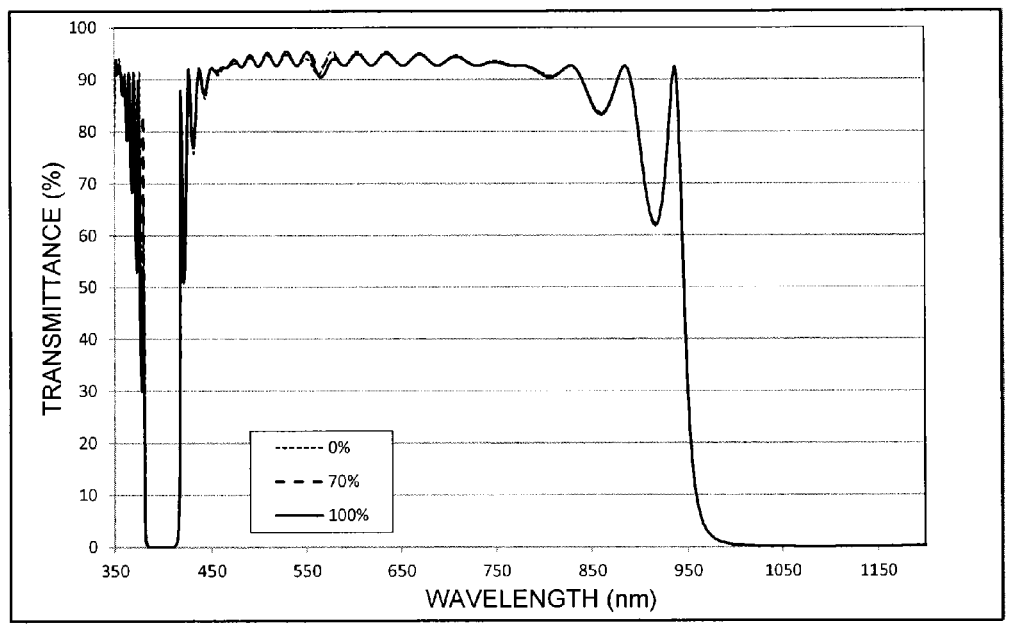
FIG. 17 is a graph illustrating simulation results of spectral characteristics under the incident condition of 0° of an optical multilayer listed in Table 7.
Figure 18:
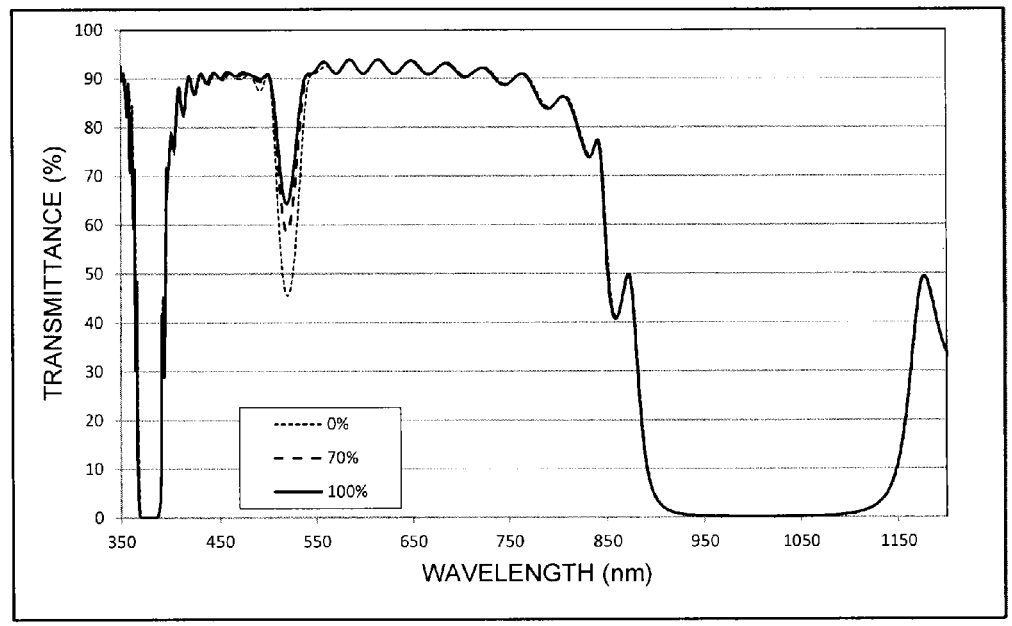
FIG. 18 is a graph illustrating simulation results of spectral characteristics under the incident condition of 45° of the optical multilayer listed in Table 7.

FIG. 17 is a graph illustrating the simulation results of spectral characteristics under the incident condition of 0° of the optical multilayer listed in Table 7. Further, FIG. 18 is a graph illustrating the simulation results of spectral characteristics under the incident condition of 45° of the optical multilayer listed in Table 7. From the above, it is found that in the case where the maximum value and the minimum value of $T_L/T_H$ in which there is no part where the transmittance locally decreases by 5% or more in the wavelength range of 400 nm to 700 nm in spectral characteristics under the incident condition of 0° are set to 100% and 0% respectively, even when $T_L/T_H$ is 100%, the local decrease in transmittance in the transmission band under the incident condition of 45° is 31.2% and the optical multilayer cannot sufficiently suppress the ripple. Further, when $T_L/T_H$ is less than 100%, the local decrease in transmittance in the transmission band under the incident condition of 45° tends to increase as compared with the case where $T_L/T_H$ is 100%, and therefore the ripple cannot be sufficiently suppressed in these ranges as a matter of course. Accordingly, it is found that the layer configurations of the optical multilayer listed in Table 7 are difficult to suppress the ripple in the transmission band when the incident angle of light becomes 45°.

Example 7

Next, the optical multilayer of the present invention was formed on a glass substrate and its spectral characteristics were simulated. Note that for the glass substrate, near-infrared cut glass (NF50T, manufactured by Asahi Glass Co., Ltd.: thickness of 0.3 mm) was used.

First of all, a layer configuration of the optical multilayer formed on the glass substrate will be described. In Example 7, the optical multilayers are formed on both sides (a front side and a rear side) of the glass substrate.

The layer configuration of the optical multilayer formed on the front side is listed in the following Table 8. The optical multilayer formed on the front side is different from the IRCF of the present invention, and IRCF included in the invention disclosed in the international application (PCT/JP2012/074087) filed by the present applicant was used for the optical multilayer formed on the front side. Note that the layer thickness of each layer is a physical layer thickness (nm).

TABLE 8

| Layer number | Layer material | Layer thickness [nm] |
|---|---|---|
| 1 | $TiO_2$ | 9.2 |
| 2 | $SiO_2$ | 70.75 |
| 3 | $TiO_2$ | 24.25 |
| 4 | $SiO_2$ | 41.98 |
| 5 | $TiO_2$ | 34.81 |
| 6 | $SiO_2$ | 62.89 |
| 7 | $TiO_2$ | 19.4 |
| 8 | $SiO_2$ | 61.01 |
| 9 | $TiO_2$ | 36.5 |
| 10 | $SiO_2$ | 47.11 |
| 11 | $TiO_2$ | 16.23 |
| 12 | $SiO_2$ | 89.29 |
| 13 | $Ta_2O_5$ | 49.14 |
| 14 | $TiO_2$ | 34.04 |
| 15 | $Ta_2O_5$ | 51.16 |
| 16 | $SiO_2$ | 35.74 |
| 17 | $Ta_2O_5$ | 53.83 |
| 18 | $TiO_2$ | 36.78 |
| 19 | $Ta_2O_5$ | 52.23 |
| 20 | $SiO_2$ | 37 |
| 21 | $Ta_2O_5$ | 57.45 |
| 22 | $TiO_2$ | 36.77 |
| 23 | $Ta_2O_5$ | 47.67 |
| 24 | $SiO_2$ | 35.09 |
| 25 | $Ta_2O_5$ | 58.31 |
| 26 | $TiO_2$ | 37.36 |
| 27 | $Ta_2O_5$ | 47.31 |
| 28 | $SiO_2$ | 31.4 |
| 29 | $Ta_2O_5$ | 58.07 |
| 30 | $TiO_2$ | 37.85 |
| 31 | $Ta_2O_5$ | 47.39 |
| 32 | $SiO_2$ | 30.11 |
| 33 | $Ta_2O_5$ | 57.97 |
| 34 | $TiO_2$ | 38.67 |
| 35 | $Ta_2O_5$ | 48.11 |
| 36 | $SiO_2$ | 30.39 |
| 37 | $Ta_2O_5$ | 56.36 |
| 38 | $TiO_2$ | 38.87 |
| 39 | $Ta_2O_5$ | 49.1 |
| 40 | $SiO_2$ | 27.91 |
| 41 | $Ta_2O_5$ | 56.44 |
| 42 | $TiO_2$ | 39.45 |

TABLE 8-continued

| Layer number | Layer material | Layer thickness [nm] |
|---|---|---|
| 43 | $Ta_2O_5$ | 49.85 |
| 44 | $SiO_2$ | 26.88 |
| 45 | $Ta_2O_5$ | 56.08 |
| 46 | $TiO_2$ | 39.77 |
| 47 | $Ta_2O_5$ | 50.58 |
| 48 | $SiO_2$ | 26.08 |
| 49 | $Ta_2O_5$ | 55.88 |
| 50 | $TiO_2$ | 40.29 |
| 51 | $Ta_2O_5$ | 52.18 |
| 52 | $SiO_2$ | 24.81 |
| 53 | $Ta_2O_5$ | 55.08 |
| 54 | $TiO_2$ | 40.34 |
| 55 | $Ta_2O_5$ | 52.98 |
| 56 | $SiO_2$ | 25.6 |
| 57 | $Ta_2O_5$ | 55.48 |
| 58 | $TiO_2$ | 40.82 |
| 59 | $Ta_2O_5$ | 52.84 |
| 60 | $SiO_2$ | 29.93 |
| 61 | $Ta_2O_5$ | 63.65 |
| 62 | $TiO_2$ | 43.18 |
| 63 | $Ta_2O_5$ | 13.95 |
| 64 | $SiO_2$ | 74.77 |

Next, the layer configuration of the optical multilayer formed on the rear side is listed in the following Table 9. The layer thickness of each layer is a physical layer thickness (nm). Note that, in the optical multilayer formed on the rear side, a first layer to an 18-th layer make a UV cut filter (corresponding to the UV cut part 12A), and the 18-th layer to an 86-th layer make the optical multilayers (corresponding to the first and second SWPF parts 12B, 12C) of the present invention. Hereinafter, the optical multilayers are called a UV cut (corresponding to the UV cut part 12A), an SWPF1 (corresponding to the first SWPF part 12B) and an SWPF2 (corresponding to the second SWPF part 12C).

Note that, in the physical layer thickness 140.23 nm of the 18-th layer, 90 nm is a layer for the UV cut, and remaining 50.23 nm is a layer for the SWPF1. Further, in the physical layer thickness 159.64 nm of the 54-th layer, 75 nm is a layer for the SWPF1, and remaining 84.64 nm is a layer for the SWPF2.

TABLE 9

| Layer number | Layer material | Layer thickness [nm] |
|---|---|---|
| 1 | $TiO_2$ | 13.42 |
| 2 | $SiO_2$ | 39.88 |
| 3 | $TiO_2$ | 46.69 |
| 4 | $SiO_2$ | 19.14 |
| 5 | $TiO_2$ | 44.9 |
| 6 | $SiO_2$ | 48.94 |
| 7 | $TiO_2$ | 20.33 |
| 8 | $SiO_2$ | 87.7 |
| 9 | $TiO_2$ | 10.65 |
| 10 | $SiO_2$ | 93.77 |
| 11 | $TiO_2$ | 24.93 |
| 12 | $SiO_2$ | 29.91 |
| 13 | $TiO_2$ | 50.6 |
| 14 | $SiO_2$ | 48.02 |
| 15 | $TiO_2$ | 7.01 |
| 16 | $SiO_2$ | 111.28 |
| 17 | $TiO_2$ | 94.75 |
| 18 | $SiO_2$ | 140.23 |
| 19 | $Ta_2O_5$ | 37.62 |
| 20 | $TiO_2$ | 30.94 |
| 21 | $Ta_2O_5$ | 29.44 |
| 22 | $SiO_2$ | 137.98 |
| 23 | $Ta_2O_5$ | 23.27 |
| 24 | $TiO_2$ | 32.62 |
| 25 | $Ta_2O_5$ | 42.88 |
| 26 | $SiO_2$ | 122.96 |
| 27 | $Ta_2O_5$ | 38.18 |
| 28 | $TiO_2$ | 34.06 |
| 29 | $Ta_2O_5$ | 29.23 |
| 30 | $SiO_2$ | 130.68 |
| 31 | $Ta_2O_5$ | 35.65 |
| 32 | $TiO_2$ | 31.63 |
| 33 | $Ta_2O_5$ | 31.17 |
| 34 | $SiO_2$ | 133.31 |
| 35 | $Ta_2O_5$ | 30.85 |
| 36 | $TiO_2$ | 33.78 |
| 37 | $Ta_2O_5$ | 35.3 |
| 38 | $SiO_2$ | 131.88 |
| 39 | $Ta_2O_5$ | 31.7 |
| 40 | $TiO_2$ | 35.05 |
| 41 | $Ta_2O_5$ | 36.54 |
| 42 | $SiO_2$ | 133.42 |
| 43 | $Ta_2O_5$ | 37.4 |
| 44 | $TiO_2$ | 36.88 |
| 45 | $Ta_2O_5$ | 33.72 |
| 46 | $SiO_2$ | 149.32 |
| 47 | $Ta_2O_5$ | 36.17 |
| 48 | $TiO_2$ | 41.38 |
| 49 | $Ta_2O_5$ | 42.57 |
| 50 | $SiO_2$ | 166.66 |
| 51 | $Ta_2O_5$ | 43.88 |
| 52 | $TiO_2$ | 41.65 |
| 53 | $Ta_2O_5$ | 40.15 |
| 54 | $SiO_2$ | 159.64 |
| 55 | $Ta_2O_5$ | 40.35 |
| 56 | $TiO_2$ | 35.39 |
| 57 | $Ta_2O_5$ | 43.22 |
| 58 | $SiO_2$ | 155.06 |
| 59 | $Ta_2O_5$ | 40.91 |
| 60 | $TiO_2$ | 35.04 |
| 61 | $Ta_2O_5$ | 43.23 |
| 62 | $SiO_2$ | 163.22 |
| 63 | $Ta_2O_5$ | 42.44 |
| 64 | $TiO_2$ | 39.32 |
| 65 | $Ta_2O_5$ | 48.12 |
| 66 | $SiO_2$ | 177.02 |
| 67 | $Ta_2O_5$ | 47.62 |
| 68 | $TiO_2$ | 39.79 |
| 69 | $Ta_2O_5$ | 43.71 |
| 70 | $SiO_2$ | 171.93 |
| 71 | $Ta_2O_5$ | 43.96 |
| 72 | $TiO_2$ | 40.35 |
| 73 | $Ta_2O_5$ | 49.49 |
| 74 | $SiO_2$ | 181.25 |
| 75 | $Ta_2O_5$ | 48.38 |
| 76 | $TiO_2$ | 39.88 |
| 77 | $Ta_2O_5$ | 43.26 |
| 78 | $SiO_2$ | 172.64 |
| 79 | $Ta_2O_5$ | 45.42 |
| 80 | $TiO_2$ | 39.84 |
| 81 | $Ta_2O_5$ | 47.82 |
| 82 | $SiO_2$ | 186 |
| 83 | $Ta_2O_5$ | 58.34 |
| 84 | $TiO_2$ | 43.3 |
| 85 | $Ta_2O_5$ | 21.17 |
| 86 | $SiO_2$ | 80.73 |

Figure 19:
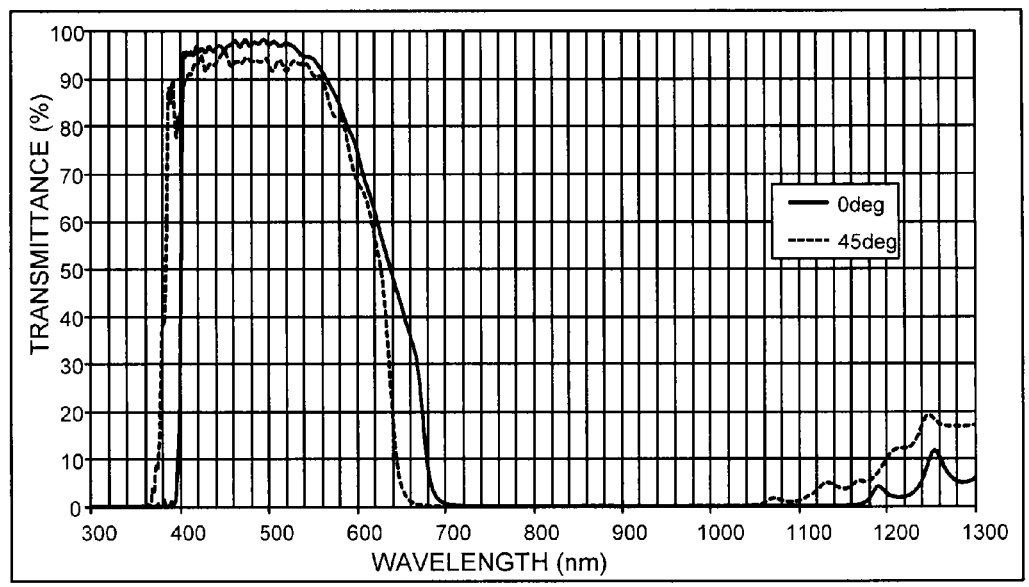
FIG. 19 is a graph illustrating simulation results of spectral characteristics under incident conditions of 0° and 45° of a glass substrate (NF50T) provided with optical multilayers listed in Table 8 and Table 9.

FIG. 19 is a graph illustrating the simulation results of spectral characteristics under incident conditions of 0° (solid line) and 45° (chain line) for the glass substrate (NF50T) provided with the optical multilayers listed in Table 8 and Table 9.

As illustrated in FIG. 19, it has been found that even when the optical multilayer of the present invention was applied to an actual product, the product includes the transmission band where the mean transmittance is 85% or higher in the wavelength range of 400 nm to 700 nm and the stopband of the region where the mean transmittance is 10% or lower in the wavelength range of 780 nm to 1000 nm on the near-infrared side of the transmission band. It has also been found that the local decrease in transmittance in the transmission band (in the wavelength range of 400 nm to 700 nm) in spectral characteristics under the incident condition of 0° and 45° are 12% or less.

Figure 20:
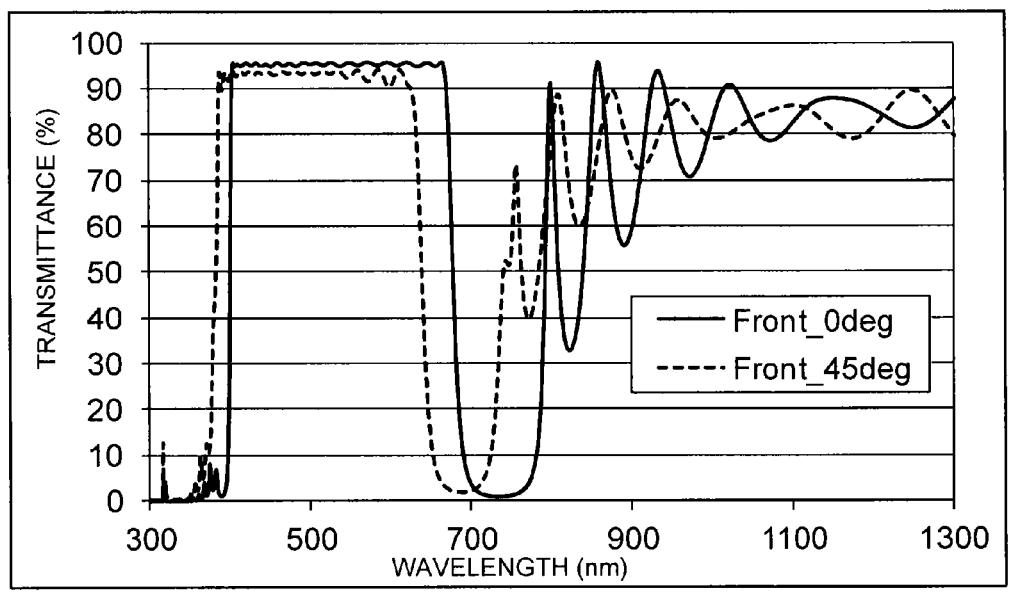
FIG. 20 is a graph illustrating simulation results of the spectral characteristics under incident conditions of 0° and 45° of a high transparency glass substrate provided with optical multilayer (IRCF) listed in Table 8.

Next, the simulation results of the spectral characteristics under incident conditions of 0° (solid line) and 45° (chain line) for the high transparency glass substrate (B270, plate thickness of 0.3 mm, manufactured by Schott AG which also applies to the following) provided only with the IRCF listed in Table 8 are illustrated in FIG. 20. As is also obvious from FIG. 20, the incident angle dependence of the IRCF on the front side is suppressed and the ripple at oblique incidence of light in the visible region is extremely small. However, the width of the stopband to cut the near-infrared region is narrow.

Figure 21:
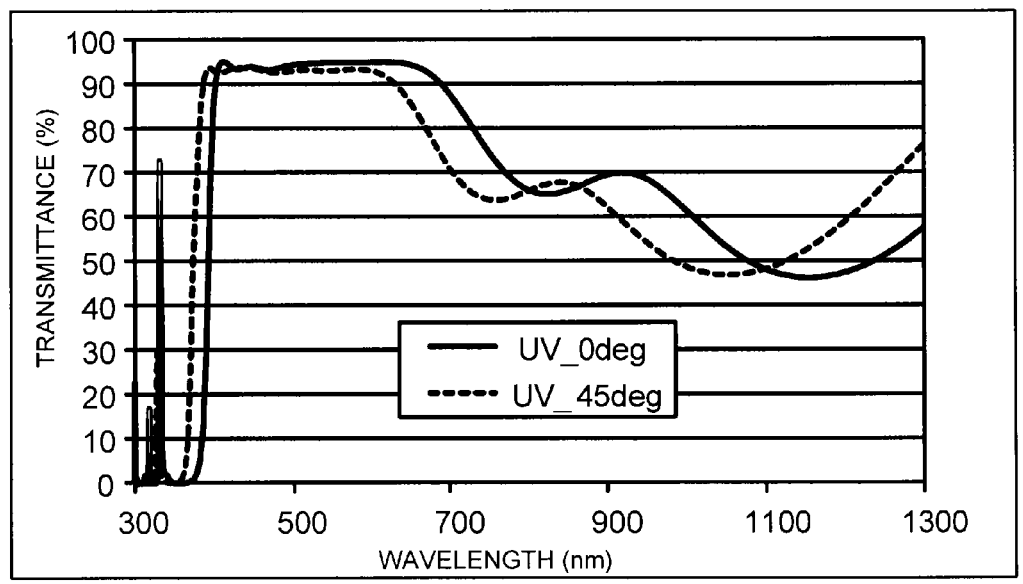
FIG. 21 is a graph illustrating simulation results of spectral characteristics under incident conditions of 0° and 45° of a high transparency glass substrate provided with a UV cut among the optical multilayers listed in Table 9.

Next, the simulation results of spectral characteristics of the high transparency glass substrate provided only with the UV cut formed on the rear side are illustrated in FIG. 21. Though the optical characteristics of only the UV cut were simulated as illustrated in FIG. 21, it has been found that the local decrease in transmittance in the transmission band (in the wavelength range of 400 nm to 700 nm) in spectral characteristics under the incident conditions of 0° (solid line) and 45° (chain line) are 12% or less.

Next, for the SWPF1, layer configurations at 100% (maximum value) and 0% (minimum value) of $2T_L/(T_H+2T_M)$ in which there is no part where the transmittance locally decreases by 5% or more in the wavelength range of 400 nm to 700 nm in spectral characteristics under the incident condition of 0° were investigated by simulations. The layer configurations of the SWPF1 and the layer configurations at 100% and 0% calculated by the simulations are listed in the following Table 10.

Here, 100% (maximum value) of $2T_L/(T_H+2T_M)$ was 0.761, and 0% (minimum value) thereof was 0.702. Further, the value of $2T_L/(T_H+2T_M)$ of the SWPF1 was 0.753. Accordingly, the value of $2T_L/(T_H+2T_M)$ of the SWPF1 is 87.1% which falls within the range of 100% to 70%.

TABLE 10

| Layer number | Layer material | @Wavelength 500 nm Refractive index | SWPF1 Layer thickness [nm] | QWOT | 100% Layer thickness [nm] | QWOT | 0% Layer thickness [nm] | QWOT |
|---|---|---|---|---|---|---|---|---|
| 1 | $SiO_2$ | 1.48 | 50.23 | 0.595 | 50.48 | 0.598 | 48.32 | 0.572 |
| 2 | $Ta_2O_5$ | 2.19 | 37.62 | 0.659 | 37.43 | 0.656 | 38.82 | 0.680 |
| 3 | $TiO_2$ | 2.47 | 30.94 | 0.611 | 30.79 | 0.608 | 31.93 | 0.631 |
| 4 | $Ta_2O_5$ | 2.19 | 29.44 | 0.516 | 29.29 | 0.513 | 30.38 | 0.532 |
| 5 | $SiO_2$ | 1.48 | 137.98 | 1.634 | 138.67 | 1.642 | 132.74 | 1.572 |
| 6 | $Ta_2O_5$ | 2.19 | 23.27 | 0.408 | 23.15 | 0.406 | 24.01 | 0.421 |
| 7 | $TiO_2$ | 2.47 | 32.62 | 0.645 | 32.46 | 0.641 | 33.66 | 0.665 |
| 8 | $Ta_2O_5$ | 2.19 | 42.88 | 0.751 | 42.67 | 0.748 | 44.25 | 0.775 |
| 9 | $SiO_2$ | 1.48 | 122.96 | 1.456 | 123.57 | 1.463 | 118.29 | 1.401 |
| 10 | $Ta_2O_5$ | 2.19 | 38.18 | 0.669 | 37.99 | 0.666 | 39.4 | 0.690 |
| 11 | $TiO_2$ | 2.47 | 34.06 | 0.673 | 33.89 | 0.670 | 35.15 | 0.695 |
| 12 | $Ta_2O_5$ | 2.19 | 29.23 | 0.512 | 29.08 | 0.509 | 30.17 | 0.529 |
| 13 | $SiO_2$ | 1.48 | 130.68 | 1.547 | 131.33 | 1.555 | 125.71 | 1.488 |
| 14 | $Ta_2O_5$ | 2.19 | 35.65 | 0.625 | 35.47 | 0.621 | 36.79 | 0.645 |
| 15 | $TiO_2$ | 2.47 | 31.63 | 0.625 | 31.47 | 0.622 | 32.64 | 0.645 |
| 16 | $Ta_2O_5$ | 2.19 | 31.17 | 0.546 | 31.01 | 0.543 | 32.17 | 0.564 |
| 17 | $SiO_2$ | 1.48 | 133.31 | 1.578 | 133.98 | 1.586 | 128.24 | 1.518 |
| 18 | $Ta_2O_5$ | 2.19 | 30.85 | 0.540 | 30.7 | 0.538 | 31.84 | 0.558 |
| 19 | $TiO_2$ | 2.47 | 33.78 | 0.667 | 33.61 | 0.664 | 34.86 | 0.689 |
| 20 | $Ta_2O_5$ | 2.19 | 35.3 | 0.618 | 35.12 | 0.615 | 36.43 | 0.638 |
| 21 | $SiO_2$ | 1.48 | 131.88 | 1.561 | 132.54 | 1.569 | 126.87 | 1.502 |
| 22 | $Ta_2O_5$ | 2.19 | 31.7 | 0.555 | 31.54 | 0.553 | 32.71 | 0.573 |
| 23 | $TiO_2$ | 2.47 | 35.05 | 0.693 | 34.87 | 0.689 | 36.17 | 0.715 |
| 24 | $Ta_2O_5$ | 2.19 | 36.54 | 0.640 | 36.36 | 0.637 | 37.71 | 0.661 |
| 25 | $SiO_2$ | 1.48 | 133.42 | 1.580 | 134.09 | 1.588 | 128.35 | 1.520 |
| 26 | $Ta_2O_5$ | 2.19 | 37.4 | 0.655 | 37.21 | 0.652 | 38.6 | 0.676 |
| 27 | $TiO_2$ | 2.47 | 36.88 | 0.729 | 36.7 | 0.725 | 38.06 | 0.752 |
| 28 | $Ta_2O_5$ | 2.19 | 33.72 | 0.591 | 33.55 | 0.588 | 34.8 | 0.610 |
| 29 | $SiO_2$ | 1.48 | 149.32 | 1.768 | 150.07 | 1.777 | 143.65 | 1.701 |
| 30 | $Ta_2O_5$ | 2.19 | 36.17 | 0.634 | 35.99 | 0.631 | 37.33 | 0.654 |
| 31 | $TiO_2$ | 2.47 | 41.38 | 0.818 | 41.17 | 0.814 | 42.7 | 0.844 |
| 32 | $Ta_2O_5$ | 2.19 | 42.57 | 0.746 | 42.36 | 0.742 | 43.93 | 0.770 |
| 33 | $SiO_2$ | 1.48 | 166.66 | 1.973 | 167.49 | 1.983 | 160.33 | 1.898 |
| 34 | $Ta_2O_5$ | 2.19 | 43.88 | 0.769 | 43.66 | 0.765 | 45.28 | 0.793 |
| 35 | $TiO_2$ | 2.47 | 41.65 | 0.823 | 41.44 | 0.819 | 42.98 | 0.849 |
| 36 | $Ta_2O_5$ | 2.19 | 40.15 | 0.703 | 39.95 | 0.700 | 41.43 | 0.726 |
| 37 | $SiO_2$ | 1.48 | 75 | 0.888 | 75.37 | 0.892 | 72.15 | 0.854 |

Figure 22:
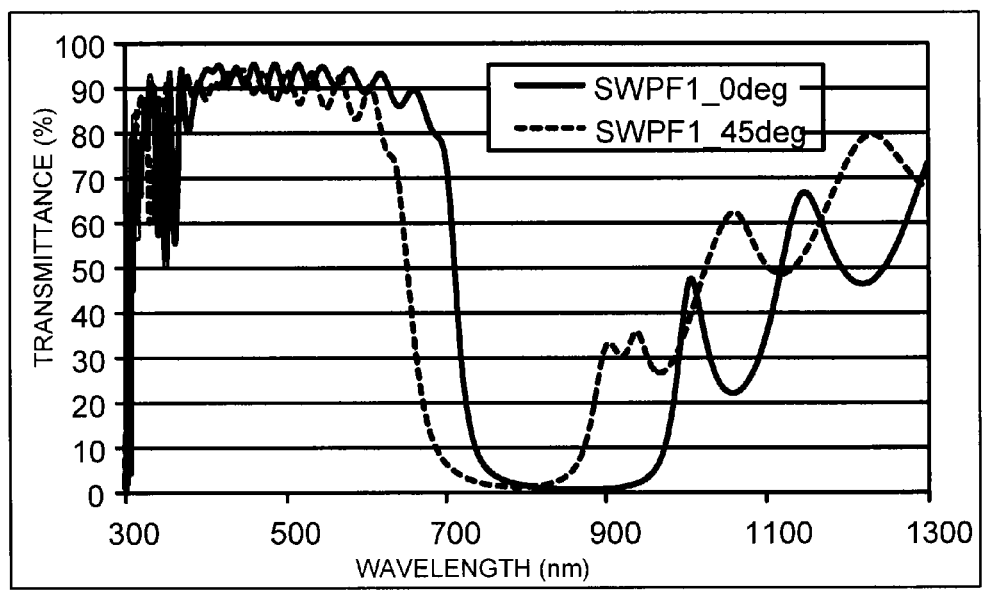
FIG. 22 is a graph illustrating simulation results of spectral characteristics under incident conditions of 0° and 45° of a high transparency glass substrate provided with an SWPF1 among the optical multilayers listed in Table 9.

FIG. 22 is a graph illustrating the simulation results of the spectral characteristics under incident conditions of 0° (solid line) and 45° (broken line) for the high transparency glass substrate provided only with the SWPF1. From FIG. 22, it is found that even under the incident condition of 45°, the ripple in the transmission band in the wavelength range of 400 nm to 700 nm can be suppressed and a local decrease in transmittance is also low.

Figure 23:
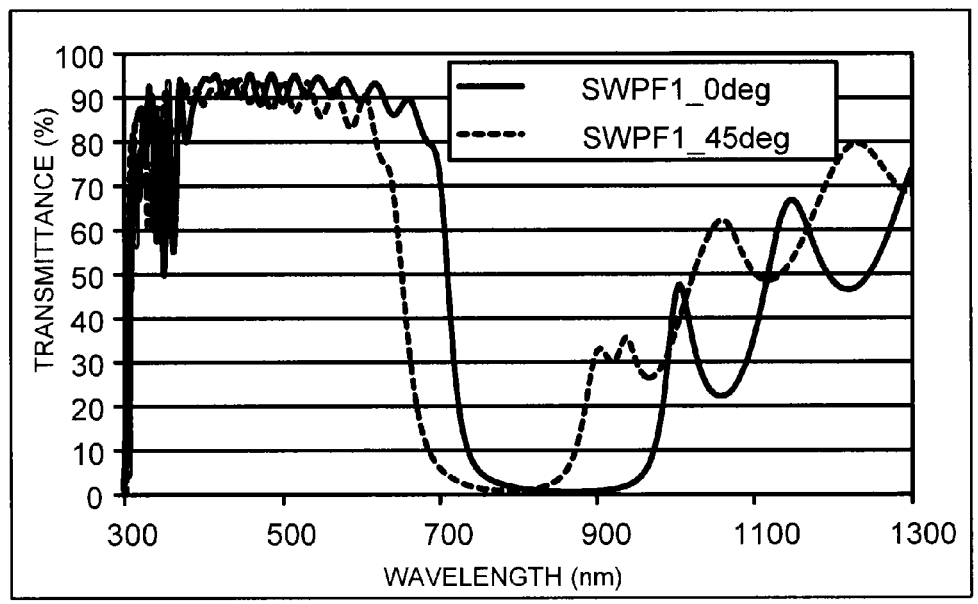
FIG. 23 is a graph illustrating simulation results of spectral characteristics of a high transparency glass substrate provided with the SWPF1 in the case where a value of $2T_L/(T_H+2T_M)$ is 100%.
Figure 24:
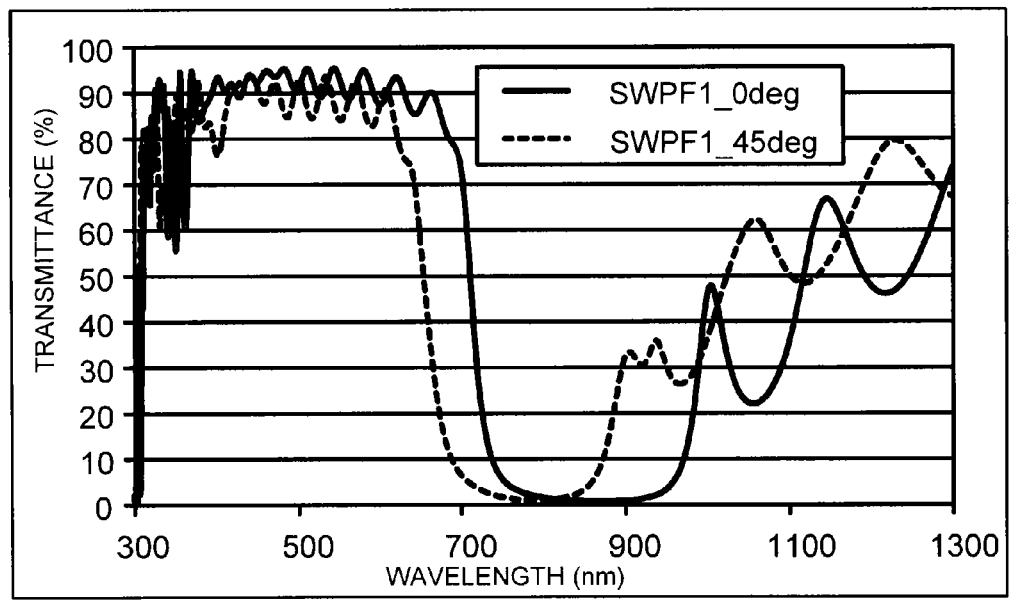
FIG. 24 is a graph illustrating simulation results of spectral characteristics of the high transparency glass substrate provided with the SWPF1 in the case where the value of $2T_L/(T_H+2T_M)$ is 0%.

Note that, for reference, the simulation results of the high transparency glass substrate having the layer configurations at 100% and 0% are illustrated in FIG. 23 (100%) and FIG. 24 (0%), respectively. It is found that a ripple in the transmission band in the wavelength range of 400 nm to 700 nm can be suppressed even under the incident condition of 45° in FIG. 23 (100%) and a ripple occurs near 400 nm under the incident condition of 45° in FIG. 24 (0%).

Next, for the SWPF2, layer configurations at 100% (maximum value) and 0% (minimum value) of $2T_L/(T_H+2T_M)$ in which there is no part where the transmittance locally decreases by 5% or more in the wavelength range of 400 nm to 700 nm in spectral characteristics under the incident condition of 0° were investigated by simulations. The layer configurations of the SWPF2 and the layer configurations at 100% and 0% calculated by the simulations are listed in the following Table 11.

Here, 100% (maximum value) of $2T_L/(T_H+2T_M)$ was 0.784, and 0% (minimum value) thereof was 0.732. Further, the value of $2T_L/(T_H+2T_M)$ of the SWPF2 was 0.778. Accordingly, the value of $2T_L/(T_H+2T_M)$ of the SWPF2 is 87.9% which falls within the range of 100% to 70%.

TABLE 11

| Layer number | Layer material | @Wavelength 500 nm Refractive index | SWPF2 Layer thickness [nm] | QWOT | 100% Layer thickness [nm] | QWOT | 0% Layer thickness [nm] | QWOT |
|---|---|---|---|---|---|---|---|---|
| 1 | $SiO_2$ | 1.48 | 84.64 | 1.002 | 84.98 | 1.006 | 82.1 | 0.972 |
| 2 | $Ta_2O_5$ | 2.19 | 40.35 | 0.707 | 40.19 | 0.704 | 41.56 | 0.728 |
| 3 | $TiO_2$ | 2.47 | 35.39 | 0.699 | 35.25 | 0.697 | 36.45 | 0.720 |
| 4 | $Ta_2O_5$ | 2.19 | 43.22 | 0.757 | 43.05 | 0.754 | 44.52 | 0.780 |
| 5 | $SiO_2$ | 1.48 | 155.06 | 1.836 | 155.68 | 1.843 | 150.41 | 1.781 |
| 6 | $Ta_2O_5$ | 2.19 | 40.91 | 0.717 | 40.75 | 0.714 | 42.14 | 0.738 |
| 7 | $TiO_2$ | 2.47 | 35.04 | 0.692 | 34.9 | 0.690 | 36.09 | 0.713 |
| 8 | $Ta_2O_5$ | 2.19 | 43.23 | 0.757 | 43.06 | 0.754 | 44.53 | 0.780 |
| 9 | $SiO_2$ | 1.48 | 163.22 | 1.933 | 163.87 | 1.940 | 158.32 | 1.875 |
| 10 | $Ta_2O_5$ | 2.19 | 42.44 | 0.744 | 42.27 | 0.741 | 43.71 | 0.766 |
| 11 | $TiO_2$ | 2.47 | 39.32 | 0.777 | 39.16 | 0.774 | 40.5 | 0.800 |
| 12 | $Ta_2O_5$ | 2.19 | 48.12 | 0.843 | 47.93 | 0.840 | 49.56 | 0.868 |
| 13 | $SiO_2$ | 1.48 | 177.02 | 2.096 | 177.73 | 2.104 | 171.71 | 2.033 |
| 14 | $Ta_2O_5$ | 2.19 | 47.62 | 0.834 | 47.43 | 0.831 | 49.05 | 0.859 |
| 15 | $TiO_2$ | 2.47 | 39.79 | 0.786 | 39.63 | 0.783 | 40.98 | 0.810 |
| 16 | $Ta_2O_5$ | 2.19 | 43.71 | 0.766 | 43.54 | 0.763 | 45.02 | 0.789 |
| 17 | $SiO_2$ | 1.48 | 171.93 | 2.036 | 172.62 | 2.044 | 166.77 | 1.975 |
| 18 | $Ta_2O_5$ | 2.19 | 43.96 | 0.770 | 43.78 | 0.767 | 45.28 | 0.793 |
| 19 | $TiO_2$ | 2.47 | 40.35 | 0.797 | 40.19 | 0.794 | 41.56 | 0.821 |
| 20 | $Ta_2O_5$ | 2.19 | 49.49 | 0.867 | 49.29 | 0.864 | 50.97 | 0.893 |
| 21 | $SiO_2$ | 1.48 | 181.25 | 2.146 | 181.98 | 2.155 | 175.81 | 2.082 |
| 22 | $Ta_2O_5$ | 2.19 | 48.38 | 0.848 | 48.19 | 0.844 | 49.83 | 0.873 |
| 23 | $TiO_2$ | 2.47 | 39.88 | 0.788 | 39.72 | 0.785 | 41.08 | 0.812 |
| 24 | $Ta_2O_5$ | 2.19 | 43.26 | 0.758 | 43.09 | 0.755 | 44.56 | 0.781 |
| 25 | $SiO_2$ | 1.48 | 172.64 | 2.044 | 173.33 | 2.052 | 167.46 | 1.983 |
| 26 | $Ta_2O_5$ | 2.19 | 45.42 | 0.796 | 45.24 | 0.793 | 46.78 | 0.820 |
| 27 | $TiO_2$ | 2.47 | 39.84 | 0.787 | 39.68 | 0.784 | 41.04 | 0.811 |
| 28 | $Ta_2O_5$ | 2.19 | 47.82 | 0.838 | 47.63 | 0.834 | 49.25 | 0.863 |
| 29 | $SiO_2$ | 1.48 | 186 | 2.202 | 186.74 | 2.211 | 180.42 | 2.136 |
| 30 | $Ta_2O_5$ | 2.19 | 58.34 | 1.022 | 58.11 | 1.018 | 60.09 | 1.053 |
| 31 | $TiO_2$ | 2.47 | 43.3 | 0.856 | 43.13 | 0.852 | 44.6 | 0.881 |
| 32 | $Ta_2O_5$ | 2.19 | 21.17 | 0.371 | 21.09 | 0.369 | 21.81 | 0.382 |
| 33 | $SiO_2$ | 1.48 | 80.73 | 0.956 | 81.05 | 0.960 | 78.31 | 0.927 |

Figure 25:
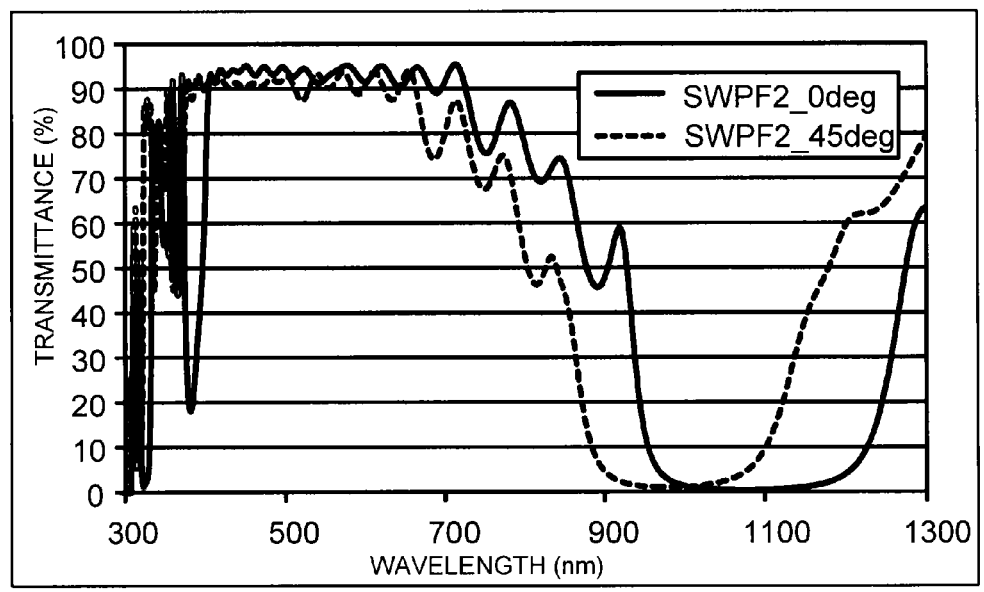
FIG. 25 is a graph illustrating simulation results of spectral characteristics under incident conditions of 0° and 45° of a high transparency glass substrate provided with an SWPF2 among the optical multilayers listed in Table 9.

FIG. 25 is a graph illustrating the simulation results of the spectral characteristics under incident conditions of 0° (solid line) and 45° (broken line) for the high transparency glass substrate provided only with the SWPF2. From FIG. 25, it is found that even under the incident condition of 45°, the ripple in the transmission band in the wavelength range of 400 nm to 700 nm can be suppressed and a local decrease in transmittance is also low.

Figure 26:
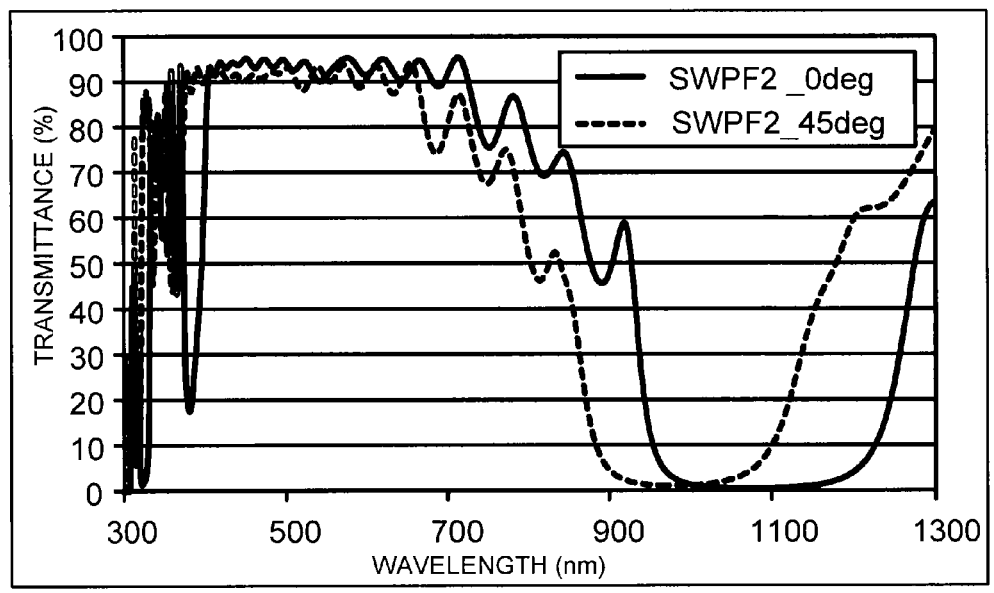
FIG. 26 is a graph illustrating simulation results of spectral characteristics of the high transparency glass substrate provided with the SWPF2 in the case where the value of $2T_L/(T_H+2T_M)$ is 100%.
Figure 27:
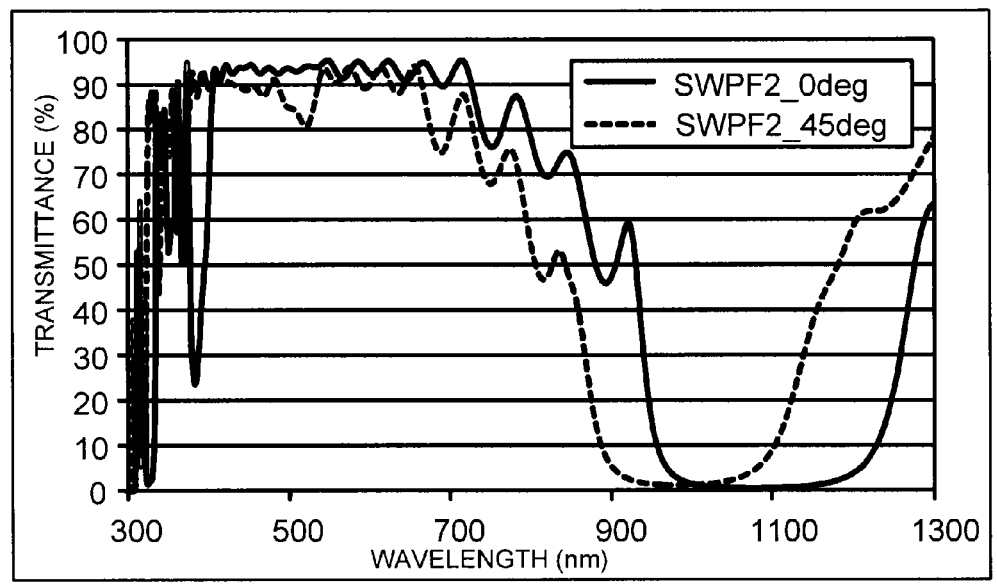
FIG. 27 is a graph illustrating simulation results of spectral characteristics of the high transparency glass substrate provided with the SWPF2 in the case where the value of $2T_L/(T_H+2T_M)$ is 0%.

Note that, for reference, the simulation results of the high transparency glass substrate provided with the optical multilayer at 100% and 0% are illustrated in FIG. 26 (100%) and FIG. 27 (0%), respectively. It is found that a ripple in the transmission band in the wavelength range of 400 nm to 700 nm can be suppressed even under the incident condition of 45° in FIG. 26 (100%) and a ripple occurs near 500 nm under the incident condition of 45° in FIG. 27 (0%).

Figure 28:
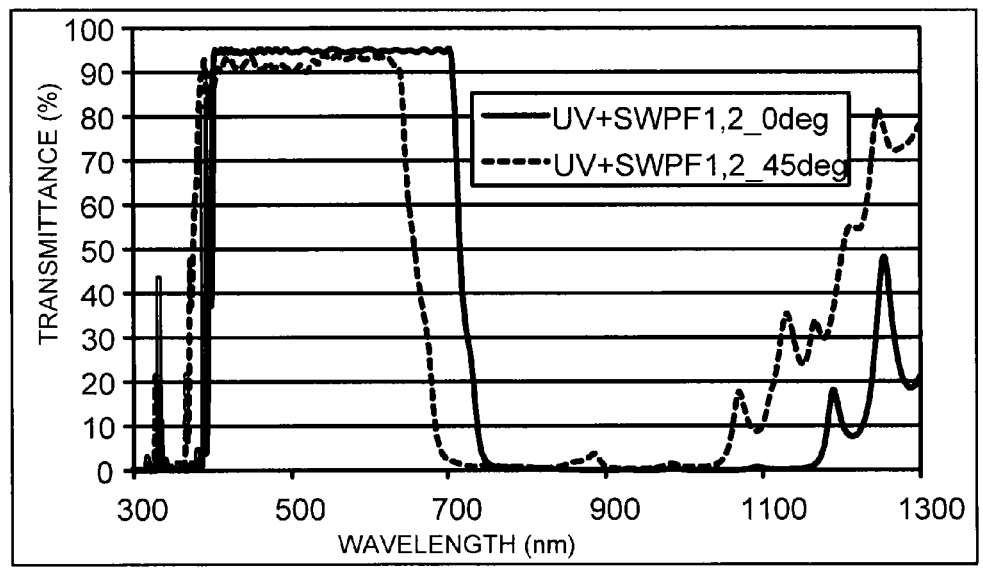
FIG. 28 is a graph illustrating simulation results of spectral characteristics under incident conditions of 0° and 45° of the high transparency glass substrate provided with the optical multilayers listed in Table 9.

FIG. 28 is a graph illustrating the simulation results of the spectral characteristics under incident conditions of 0° (solid line) and 45° (broken line) for the high transparency glass substrate provided with all of the optical multilayers (the UV cut, the SWPF1, the SWPF2) formed on the rear side. From FIG. 28, it is found that even under the incident condition of 45°, the ripple in the transmission band in the wavelength range of 400 nm to 700 nm can be suppressed and a local decrease in transmittance is also low. It is also found that light can be surely cut in a wavelength range of the near-infrared region.

From the above, the near-infrared cut filter of the present invention can very efficiently suppress a ripple.

The near-infrared cut filter of the present invention can suppress a ripple in a transmission band depending on the incident angle of light. Therefore, the near-infrared cut filter of the embodiment can be preferably used for spectral correction of the solid-state imaging devices (for example, a CCD image sensor, a CMOS image sensor and the like) such as a digital camera, a digital video and the like.

What is claimed is:

1. A near-infrared cut filter comprising a transparent substrate and an optical multilayer provided on at least one of principal surfaces of the transparent substrate,
    wherein the optical multilayer comprises a repeated layered structure having:
        a high-refractive index layer comprising $TiO_2$ and having a refractive index at a wavelength of 500 nm of 2.0 or higher;
        a middle-refractive index layer comprising $Ta_2O_5$ and having a refractive index at the wavelength of 500 nm of 1.6 or higher and lower than the refractive index of the high-refractive index layer; and a low-refractive index layer comprising $SiO_2$ and having a refractive index at the wavelength of 500 nm of lower than 1.6, the repeated layered structure being expressed by a repeat of $(LMHML)\hat{\ }n$ (n is a natural number of 1 or more) where the high-refractive index layer is H, the middle-refractive index layer is M, and the low-refractive index layer is L, wherein the optical multilayer comprises a transmission band where a mean transmittance is 85% or higher in a wavelength range from 400 nm to 700 nm, and a stopband having a width of 100 nm to 280 nm where a mean transmittance is 10% or lower in a wavelength range from 750 nm to 1100 nm, and wherein the high-refractive index layer, the middle-refractive index layer, and the low-refractive index layer are stacked so that, where a QWOT (Quarter-wave Optical Thickness) of the high-refractive index layer of the optical multilayer is $T_H$, a QWOT of the middle-refractive index layer is $T_M$, and a QWOT of the low-refractive index layer is $T_L$, in a case where the refractive index of the middle-refractive index layer is equal to or higher than an intermediate value between the refractive index of the high-refractive index layer and the refractive index of the low-refractive index layer, $2T_L/(T_H+2T_M)$ falls within a range from 100% to 70% when a maximum value of $2T_L/(T_H+2T_M)$ in which there is no part where a transmittance locally decreases by 5% or more in the wavelength range of 400 nm to 700 nm in spectral characteristics under a vertical incident condition is set to 100% and a minimum value thereof is set to 0%, and in a case where the refractive index of the middle-refractive index layer is lower than the intermediate value between the refractive index of the high-refractive index layer and the refractive index of the low-refractive index layer, $(2T_L+2T_M)/T_H$ falls within a range from 100% to 70% when a maximum value of $(2T_L+2T_M)/T_H$ in which there is no part where the transmittance locally decreases by 5% or more in the wavelength range of 400 nm to 700 nm in the spectral characteristics under the vertical incident condition is set to 100% and a minimum value thereof is set to 0%, wherein $2T_L/(T_H+2T_m)$ falls within a range of 0.852 to 0.867.

2. A near-infrared cut filter comprising a transparent substrate and an optical multilayer provided on at least one of principal surfaces of the transparent substrate, wherein the optical multilayer comprises a repeated layered structure having:

a high-refractive index layer comprising $TiO_2$ and having a refractive index at a wavelength of 500 nm of 2.0 or higher;

a middle-refractive index layer comprising $Al_2O_3$ and having a refractive index at the wavelength of 500 nm of 1.6 or higher and lower than the refractive index of the high-refractive index layer; and a low-refractive index layer comprising $SiO_2$ and having a refractive index at the wavelength of 500 nm of lower than 1.6, the repeated layered structure being expressed by a repeat of $(LMHML)\hat{\ }n$ (n is a natural number of 1 or more) where the high-refractive index layer is H, the middle-refractive index layer is M, and the low-refractive index layer is L, wherein the optical multilayer comprises a transmission band where a mean transmittance is 85% or higher in a wavelength range from 400 nm to 700 nm, and a stopband having a width of 100 nm to 280 nm where a mean transmittance is 10% or lower in a wavelength range from 750 nm to 1100 nm, and wherein the high-refractive index layer, the middle-refractive index layer, and the low-refractive index layer are stacked so that, where a QWOT (Quarter-wave Optical Thickness) of the high-refractive index layer of the optical multilayer is $T_H$, a QWOT of the middle-refractive index layer is $T_M$, and a QWOT of the low-refractive index layer is $T_L$, in a case where the refractive index of the middle-refractive index layer is equal to or higher than an intermediate value between the refractive index of the high-refractive index layer and the refractive index of the low-refractive index layer, $2T_L/(T_H+2T_M)$ falls within a range from 100% to 70% when a maximum value of $2T_L/(T_H+2T_M)$ in which there is no part where a transmittance locally decreases by 5% or more in the wavelength range of 400 nm to 700 nm in spectral characteristics under a vertical incident condition is set to 100% and a minimum value thereof is set to 0%, and in a case where the refractive index of the middle-refractive index layer is lower than the intermediate value between the refractive index of the high-refractive index layer and the refractive index of the low-refractive index layer, $(2T_L+2T_M)/T_H$ falls within a range from 100% to 70% when a maximum value of $(2T_L+2T_M)/T_H$ in which there is no part where the transmittance locally decreases by 5% or more in the wavelength range of 400 nm to 700 nm in the spectral characteristics under the vertical incident condition is set to 100% and a minimum value thereof is set to 0%, wherein $(2T_L+2T_M)/T_H$ falls within a range of 1.167 to 1.218.

3. A near-infrared cut filter comprising a transparent substrate and an optical multilayer provided on at least one of principal surfaces of the transparent substrate, wherein the optical multilayer comprises a repeated layered structure having:

a high-refractive index layer comprising $Nb_2O_5$ and having a refractive index at a wavelength of 500 nm of 2.0 or higher;

a middle-refractive index layer comprising $Al_2O_3$ and having a refractive index at the wavelength of 500 nm of 1.6 or higher and lower than the refractive index of the high-refractive index layer; and a low-refractive index layer comprising $SiO_2$ and having a refractive index at the wavelength of 500 nm of lower than 1.6, the repeated layered structure being expressed by a repeat of $(LMHML)\hat{\ }n$ (n is a natural number of 1 or more) where the high-refractive index layer is H, the middle-refractive index layer is M, and the low-refractive index layer is L, wherein the optical multilayer comprises
  a transmission band where a mean transmittance is 85% or higher in a wavelength range from 400 nm to 700 nm, and
  a stopband having a width of 100 nm to 280 nm where a mean transmittance is 10% or lower in a wavelength range from 750 nm to 1100 nm, and
wherein the high-refractive index layer, the middle-refractive index layer, and the low-refractive index layer are stacked so that,
  where a QWOT (Quarter-wave Optical Thickness) of the high-refractive index layer of the optical multilayer is $T_H$, a QWOT of the middle-refractive index layer is $T_M$, and a QWOT of the low-refractive index layer is $T_L$,
  in a case where the refractive index of the middle-refractive index layer is equal to or higher than an intermediate value between the refractive index of the high-refractive index layer and the refractive index of the low-refractive index layer,
    $2T_L/(T_H+2T_M)$ falls within a range from 100% to 70% when a maximum value of $2T_L/(T_H+2T_M)$ in which there is no part where a transmittance locally decreases by 5% or more in the wavelength range of 400 nm to 700 nm in spectral characteristics under a vertical incident condition is set to 100% and a minimum value thereof is set to 0%, and
  in a case where the refractive index of the middle-refractive index layer is lower than the intermediate value between the refractive index of the high-refractive index layer and the refractive index of the low-refractive index layer,
$(2T_L+2T_M)/T_H$ falls within a range from 100% to 70% when a maximum value of $(2T_L+2T_M)/T_H$ in which there is no part where the transmittance locally decreases by 5% or more in the wavelength range of 400 nm to 700 nm in the spectral characteristics under the vertical incident condition is set to 100% and a minimum value thereof is set to 0%,
wherein $(2T_L+2T_M)/T_H$ falls within a range of 1.191 to 1.234.

4. The near-infrared cut filter according to claim 1,
wherein the transmission band has no part where a transmittance locally decreases by 20% in the spectral characteristics under an incident condition of 0° to 45°.

5. The near-infrared cut filter according to claim 1,
wherein the near-infrared cut filter comprises at least two or more kinds of the optical multilayers.

6. The near-infrared cut filter according to claim 1,
wherein the transparent substrate has optical characteristics having absorption in a near-infrared region.

7. The near-infrared cut filter according to claim 6,
wherein the transparent substrate is fluorophosphate-based glass or phosphate-based glass containing $Cu^{2+}$ ions as a coloring component.

8. The near-infrared cut filter according to claim 6,
wherein the transparent substrate is a resin material containing a pigment absorbing near-infrared light.

9. The near-infrared cut filter according to claim 1, further comprising:
  a near-infrared cut layer provided on the same surface with the optical multilayer or on the other principal surface of the transparent substrate,
  wherein the near-infrared cut layer comprises:
    two or more of layers different in refractive index and each having a refractive index at a wavelength of 500 nm of 2.0 or higher; and
    a layer having a refractive index at the wavelength of 500 nm of lower than 1.6,
  wherein the near-infrared cut layer comprises
    a transmission band where a mean transmittance is 85% or higher in a wavelength range of 400 nm to 700 nm, and
    a stopband where a mean transmittance is 5% or lower on each of an ultraviolet side and a near-infrared side of the transmission band,
  wherein a difference between a half-power wavelength on the ultraviolet side and a half-power wavelength on the near-infrared side of the transmission band is 200 nm or more, and
  wherein a difference between the half-power wavelengths of the transmission band under a vertical incidence condition and under an incident condition of 30° is less than 10 nm in the half-power wavelength on the ultraviolet side and less than 22 nm in the half-power wavelength on the near-infrared side.

10. The near-infrared cut filter according to claim 2,
wherein the transmission band has no part where a transmittance locally decreases by 20% in the spectral characteristics under an incident condition of 0° to 45°.

11. The near-infrared cut filter according to claim 2,
wherein the near-infrared cut filter comprises at least two or more kinds of the optical multilayers.

12. The near-infrared cut filter according to claim 2,
wherein the transparent substrate has optical characteristics having absorption in a near-infrared region.

13. The near-infrared cut filter according to claim 12,
wherein the transparent substrate is fluorophosphate-based glass or phosphate-based glass containing $Cu^{2+}$ ions as a coloring component.

14. The near-infrared cut filter according to claim 12,
wherein the transparent substrate is a resin material containing a pigment absorbing near-infrared light.

15. The near-infrared cut filter according to claim 2, further comprising:
  a near-infrared cut layer provided on the same surface with the optical multilayer or on the other principal surface of the transparent substrate,
  wherein the near-infrared cut layer comprises:
    two or more of layers different in refractive index and each having a refractive index at a wavelength of 500 nm of 2.0 or higher; and
    a layer having a refractive index at the wavelength of 500 nm of lower than 1.6,
  wherein the near-infrared cut layer comprises
    a transmission band where a mean transmittance is 85% or higher in a wavelength range of 400 nm to 700 nm, and
    a stopband where a mean transmittance is 5% or lower on each of an ultraviolet side and a near-infrared side of the transmission band,
  wherein a difference between a half-power wavelength on the ultraviolet side and a half-power wavelength on the near-infrared side of the transmission band is 200 nm or more, and
  wherein a difference between the half-power wavelengths of the transmission band under a vertical incidence condition and under an incident condition of 30° is less than 10 nm in the half-power wavelength on the ultraviolet side and less than 22 nm in the half-power wavelength on the near-infrared side.

16. The near-infrared cut filter according to claim 3, wherein the transmission band has no part where a transmittance locally decreases by 20% in the spectral characteristics under an incident condition of 0° to 45°.

17. The near-infrared cut filter according to claim 3, wherein the near-infrared cut filter comprises at least two or more kinds of the optical multilayers.

18. The near-infrared cut filter according to claim 3, wherein the transparent substrate has optical characteristics having absorption in a near-infrared region.

19. The near-infrared cut filter according to claim 18, wherein the transparent substrate is fluorophosphate-based glass or phosphate-based glass containing $Cu^{2+}$ ions as a coloring component.

20. The near-infrared cut filter according to claim 18, wherein the transparent substrate is a resin material containing a pigment absorbing near-infrared light.

21. The near-infrared cut filter according to claim 3, further comprising:
a near-infrared cut layer provided on the same surface with the optical multilayer or on the other principal surface of the transparent substrate,
wherein the near-infrared cut layer comprises:
two or more of layers different in refractive index and each having a refractive index at a wavelength of 500 nm of 2.0 or higher; and
a layer having a refractive index at the wavelength of 500 nm of lower than 1.6,
wherein the near-infrared cut layer comprises
a transmission band where a mean transmittance is 85% or higher in a wavelength range of 400 nm to 700 nm, and
a stopband where a mean transmittance is 5% or lower on each of an ultraviolet side and a near-infrared side of the transmission band,
wherein a difference between a half-power wavelength on the ultraviolet side and a half-power wavelength on the near-infrared side of the transmission band is 200 nm or more, and
wherein a difference between the half-power wavelengths of the transmission band under a vertical incidence condition and under an incident condition of 30° is less than 10 nm in the half-power wavelength on the ultraviolet side and less than 22 nm in the half-power wavelength on the near-infrared side.

\* \* \* \* \*